US012711495B2

(12) United States Patent
Cripe et al.

(10) Patent No.: US 12,711,495 B2
(45) Date of Patent: Aug. 18, 2026

(54) WEB3 TRANSFER PROTOCOL

(71) Applicant: Coinbase, Inc., Oakland, CA (US)

(72) Inventors: Brian Cripe, San Francisco, CA (US); Chris Loeper, Lake Oswego, OR (US); Danyal Prout, Woodside, CA (US); Jim Cai, Moraga, CA (US); Kevin Smith, Canton, GA (US)

(*) Notice: Subject to any disclaimer, the term of this patent is extended or adjusted under 35 U.S.C. 154(b) by 281 days.

(21) Appl. No.: 18/122,647

(22) Filed: Mar. 16, 2023

(65) Prior Publication Data

US 2024/0311810 A1 Sep. 19, 2024

(51) Int. Cl.

*G06Q 20/38* (2012.01)
*G06Q 20/40* (2012.01)
*H04L 9/00* (2022.01)
*H04L 9/30* (2006.01)

(52) U.S. Cl.

CPC ....... *G06Q 20/3825* (2013.01); *G06Q 20/401* (2013.01); *H04L 9/30* (2013.01); *H04L 9/50* (2022.05)

(58) Field of Classification Search

CPC ............. G06Q 20/3825; G06Q 20/401; G06Q 20/223; G06Q 20/3678; G06Q 20/382; G06Q 20/3827; G06Q 20/3829; G06Q 20/389; G06Q 20/065; H04L 9/30; H04L 9/50

USPC ........................................................... 705/65

See application file for complete search history.

(56) References Cited

U.S. PATENT DOCUMENTS 10,373,129 B1 8/2019 James et al.
12,277,562 B1 * 4/2025 Medure .............. G06Q 20/3224
2019/0188657 A1 * 6/2019 Arora ............... G06Q 20/38215
2020/0380476 A1 * 12/2020 Trudeau ............. G06Q 20/0658
2020/0394620 A1 * 12/2020 Kim ....................... G06Q 20/02
2021/0304157 A1 9/2021 York et al.
2023/0018175 A1 1/2023 Kaplan et al.
2023/0121749 A1 4/2023 Lee
2024/0161071 A1 5/2024 Gnap et al.
2024/0163095 A1 * 5/2024 Singh ........................ H04L 9/14
2024/0185191 A1 * 6/2024 Bernardi ................... H04L 9/50
2024/0311811 A1 9/2024 Cripe et al.

OTHER PUBLICATIONS

"International Search Report and Written Opinion of the International Searching Authority," issued in connection with Int'l Appl. No. PCT/US2024/019678, dated Jul. 8, 2024 (11 pages).

* cited by examiner

*Primary Examiner* — Zeshan Qayyum
(74) *Attorney, Agent, or Firm* — Holland & Hart LLP

(57) ABSTRACT

Methods, systems, and devices for data management are described. A self-executing program of a blockchain distributed data store may receive a first message that includes indications of a sender address and a first amount of a first crypto token type to be received by a recipient address. The self-executing program may verify based at least in part on execution of the self-executing program, that the first message is validly signed by an operator associated with the self-executing program. The operator may be associated with a custodial token platform that verifies information and signs messages. The self-executing program may broadcast, after verifying that the first message is validly signed, one or more second messages that are configured to transfer the first amount of the first crypto token type to the recipient address.

17 Claims, 16 Drawing Sheets

600

WEB3 TRANSFER PROTOCOL

FIELD OF TECHNOLOGY

The present disclosure relates generally to data management, including techniques for Web3 transfer protocol.

BACKGROUND

Blockchains and related technologies may be employed to support recordation of ownership of digital assets, such as cryptocurrencies, fungible tokens, non-fungible tokens (NFTs), and the like. Generally, peer-to-peer networks support transaction validation and recordation of transfer of such digital assets on blockchains. Various types of consensus mechanisms may be implemented by the peer-to-peer networks to confirm transactions and to add blocks of transactions to the blockchain networks. Example consensus mechanisms include the proof-of-work consensus mechanism implemented by the Bitcoin network and the proof-of-stake mechanism implemented by the Ethereum network. Some nodes of a blockchain network may be associated with a digital asset exchange, which may be accessed by users to trade digital assets or trade a fiat currency for a digital asset.

DETAILED DESCRIPTION

Figure 1:
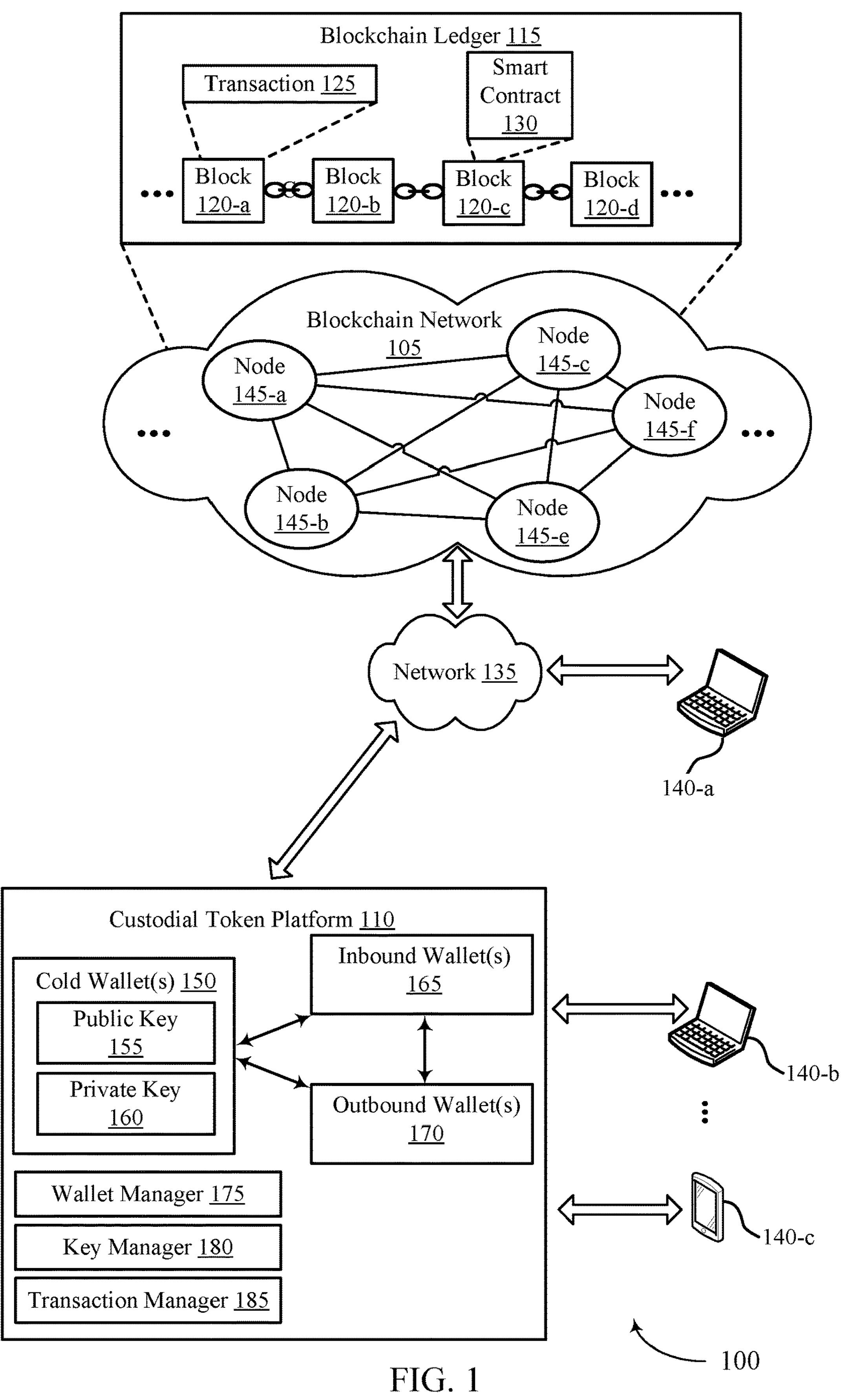
FIG. 1 illustrates an example of a computing environment that supports a Web3 transfer protocol in accordance with aspects of the present disclosure.

A blockchain network may execute smart contracts (referred to as a "self-executing program" herein) to support different types of functionality, such as decentralized finance services, token minting, token exchange, etc. In some examples, a smart contract may utilize an "oracle" to identify off-chain data to enable programmatic behavior of the smart contract. For example, the smart contract may determine whether the external data satisfies a condition set forth in the smart contract, and the smart contract may execute a token transfer after satisfaction of the condition by the external data. In some examples, however, it may be computationally and transactionally (e.g., in terms of blockchain network fees) inefficient for a smart contract to rely on an oracle for off-chain data.

Techniques described herein support smart contract settlement and transfer in a high-speed and low transactional cost manner, while supporting off-chain data components and smart contract programmatic control without or with limited use of smart contract oracle calls. More particularly, the techniques described herein support the transfer of a crypto token from a sender, to a smart contract, and then to a merchant or receiver, and the merchant may set forth the type of crypto token to receive (and the amount). Further, the sender may send one or more different types of crypto tokens, and the smart contract (in conjunction with a custodial token platform) may handle validation and token swaps, on chain, such that the merchant receives the desired token and the desired amount.

To support these techniques, a client application, such as a wallet application, may be configured to generate and transmit a transfer request to a custodial token platform. The custodial token platform may validate aspects of the request and sign a message that includes an indication of the sender address, the recipient address, and a first amount of the first crypto token type, where the first amount and the first crypto token type are set forth by the receiver or merchant. The signed message may then be communicated to the client, and the client application may broadcast a message to the blockchain network. The broadcasted message may cause the signed message to be received at a smart contract. The smart contract verifies the signature of the custodial token platform, and causes transfer of one or more tokens attributed to the client application to be transferred to a recipient address via the blockchain distributed data store. In some examples, the crypto token sent by the sender wallet is different from the token to be received by the recipient wallet, and the smart contract may broadcast one or more messages that cause exchange of the sender crypto token for the recipient or target token. For example, the smart contract may call a decentralized exchange contract, an unwrap/wrap contract, etc. to exchange the tokens. After exchange, the smart contract may broadcast one or more messages that cause transfer of the target token to the recipient address. The custodial token platform may verify that the transfer occurs by monitoring blockchain transactions associated with the smart contract and the recipient address.

Using these techniques, the custodial token platform may function to verify data (e.g., the sender tokens and amount, receiver target tokens) and provide the data to the smart contract, and the smart contract may function to facilitate transfer of the target token to the recipient. Accordingly, the custodial token platform and the smart contract may support transaction settlement for a merchant, when the merchant desires to accept one or more token types, and the sender or buyer has one or more different token types. Further, the techniques described herein support improved user experience at both the sender and the recipient. These and other techniques are described in further detail with respect to the figures.

FIG. 1 illustrates an example of a computing environment 100 that supports a Web3 transfer protocol in accordance with aspects of the present disclosure. The computing environment 100 may include a blockchain network 105 that supports a blockchain ledger 115, a custodial token platform 110, and one or more computing devices 140, which may be in communication with one another via a network 135.

The network 135 may allow the one or more computing devices 140, one or more nodes 145 of the blockchain network 105, and the custodial token platform 110 to communicate (e.g., exchange information) with one another. The network 135 may include aspects of one or more wired networks (e.g., the Internet), one or more wireless networks (e.g., cellular networks), or any combination thereof. The network 135 may include aspects of one or more public networks or private networks, as well as secured or unsecured networks, or any combination thereof. The network 135 also may include any quantity of communications links and any quantity of hubs, bridges, routers, switches, ports or other physical or logical network components.

Nodes 145 of the blockchain network 105 may generate, store, process, verify, or otherwise use data of the blockchain ledger 115. The nodes 145 of the blockchain network 105 may represent or be examples of computing systems or devices that implement or execute a blockchain application or program for peer-to-peer transaction and program execution. For example, the nodes 145 of the blockchain network 105 support recording of ownership of digital assets, such as cryptocurrencies, fungible tokens, non-fungible tokens (NFTs), and the like, and changes in ownership of the digital assets. The digital assets may be referred to as tokens, coins, crypto tokens, or the like. The nodes 145 may implement one or more types of consensus mechanisms to confirm transactions and to add blocks (e.g., blocks 120-*a*, 120-*b*, 120-*c*, and so forth) of transactions (or other data) to the blockchain ledger 115. Example consensus mechanisms include a proof-of-work consensus mechanism implemented by the Bitcoin network and a proof-of-stake consensus mechanism implemented by the Ethereum network.

When a device (e.g., the computing device 140-*a*, 140-*b*, or 140-*c*) associated with the blockchain network 105 executes or completes a transaction associated with a token supported by the blockchain ledger, the nodes 145 of the blockchain network 105 may execute a transfer instruction that broadcasts the transaction (e.g., data associated with the transaction) to the other nodes 145 of the blockchain network 105, which may execute the blockchain application to verify the transaction and add the transaction to a new block (e.g., the block 120-*d*) of a blockchain ledger (e.g., the blockchain ledger 115) of transactions after verification of the transaction. Using the implemented consensus mechanism, each node 145 *c* may function to support maintaining an accurate blockchain ledger 115 and prevent fraudulent transactions.

The blockchain ledger 115 may include a record of each transaction (e.g., a transaction 125) between wallets (e.g., wallet addresses) associated with the blockchain network 105. Some blockchains may support smart contracts, such as smart contract 130, which may be an example of a sub-program that may be deployed to the blockchain and executed when one or more conditions defined in the smart contract 130 are satisfied. For example, the nodes 145 of the blockchain network 105 may execute one or more instructions of the smart contract 130 after a method or instruction defined in the smart contract 130 is called by another device. In some examples, the blockchain ledger 115 is referred to as a blockchain distributed data store.

A computing device 140 may be used to input information to or receive information from the computing system custodial token platform 110, the blockchain network 105, or both. For example, a user of the computing device 140-*a* may provide user inputs via the computing device 145-*a*, which may result in commands, data, or any combination thereof being communicated via the network 135 to the computing system custodial token platform 110, the blockchain network 105, or both. Additionally, or alternatively, a computing device 140 *a* may output (e.g., display) data or other information received from the custodial token platform 110, the blockchain network 105, or both. A user of a computing device 140-*a* may, for example, use the computing device 140-*a* to interact with one or more user interfaces (e.g., graphical user interfaces (GUIs)) to operate or otherwise interact with the custodial token platform 110, the blockchain network 105, or both.

A computing device 140 and/or a node 145 may be a stationary device (e.g., a desktop computer or access point) or a mobile device (e.g., a laptop computer, tablet computer, or cellular phone). In some examples, a computing device 140 and/or a node 145 may be a commercial computing device, such as a server or collection of servers. And in some examples, a computing device 140 and/or a node 145 may be a virtual device (e.g., a virtual machine).

Some blockchain protocols support layer one and layer two crypto tokens. A layer one token is a token that is supported by its own blockchain protocol, meaning that the layer one token (or a derivative thereof), may be used to pay transaction fees for transacting using the blockchain protocol. A layer two token is a token that is built on top of layer one, for example, using a smart contract 130 or a decentralized application ("Dapp"). The smart contract 130 or decentralized application may issue layer two tokens to various users based on various conditions, and the users may transact using the layer two tokens, but transaction fees may be based on the layer one token (or a derivative thereof).

The custodial token platform 110 may support exchange or trading of digital assets, fiat currencies, or both by users of the custodial token platform 110. The custodial token platform 110 may be accessed via website, web application, or applications that are installed on the one or more computing devices 140. The custodial token platform 110 may be configured to interact with one or more types of blockchain networks, such as the blockchain network 105, to support digital asset purchase, exchange, deposit, and withdrawal.

For example, users may create accounts associated with the custodial token platform 110 such as to support purchasing of a digital asset via a fiat currency, selling of a digital asset via fiat currency, or exchanging or trading of digital assets. A key management service (e.g., a key manager) of the custodial token platform 110 may create, manage, or otherwise use private keys that are associated with user wallets and internal wallets. For example, if a user wishes to withdraw a token associated with the user account to an external wallet address, key manager 180) may sign a transaction associated with a wallet of the user, and broadcast the signed transaction to nodes 145 of the blockchain network 105, as described herein. In some examples, a user does not have direct access to a private key associated with a wallet or account supported or managed by the custodial token platform 110. As such, user wallets of the custodial token platform 110 may be referred to non-custodial wallets or non-custodial addresses.

The custodial token platform 110 may create, manage, delete, or otherwise use various types of wallets to support digital asset exchange. For example, the custodial token platform 110 may maintain one or more internal cold wallets 150. The internal cold wallets 150 may be an example of an offline wallet, meaning that the cold wallet 150 is not directly coupled with other computing systems or the network 135 (e.g., at all times). The cold wallet 150 may be used by the custodial token platform 110 to ensure that the custodial token platform 110 is secure from losing assets via hacks or other types of unauthorized access and to ensure that the custodial token platform 110 has enough assets to cover any potential liabilities. The one or more cold wallets 150, as well as other wallets of the blockchain network 105 may be implemented using public key cryptography, such that the cold wallet 150 is associated with a public key 155 and a private key 160. The public key 155 may be used to publicly transact via the cold wallet 150, meaning that another wallet may enter the public key 155 into a transaction such as to move assets from the wallet to the cold wallet 150. The private key 160 may be used to verify (e.g., digitally sign) transactions that are transmitted from the cold wallet 150, and the digital signature may be used by nodes 145 to verify or authenticate the transaction. Other wallets of the custodial token platform 110 and/or the blockchain network 105 may similarly use aspects of public key cryptography.

The custodial token platform 110 may also create, manage, delete, or otherwise use inbound wallets 165 and outbound wallets 170. For example, a wallet manager 175 of the custodial token platform 110 may create a new inbound wallet 165 for each user or account of the custodial token platform 110 or for each inbound transaction (e.g., deposit transaction) for the custodial token platform 110. In some examples, the custodial token platform 110 may implement techniques to move digital asset between wallets of the digital asset exchange platform. Assets may be moved based on a schedule, based on asset thresholds, liquidity requirements, or a combination thereof. In some examples, movements or exchanges of assets internally to the custodial token platform 110 may be "off-chain" meaning that the transactions associated with the movement of the digital asset are not broadcast via the corresponding blockchain network (e.g., blockchain network 105). In such cases, the custodial token platform 110 may maintain an internal accounting (e.g., ledger) of assets that are associated with the various wallets and/or user accounts.

As used herein, a wallet, such as inbound wallets 165 and outbound wallets 170 may be associated with a wallet address, which may be an example of a public key, as described herein. The wallets may be associated with a private key that is used to sign transactions and messages associated with the wallet. A wallet may also be associated with various user interface components and functionality. For example, some wallets may be associated with or leverage functionality for transmitting crypto tokens by allowing a user to enter a transaction amount, a receiver address, etc. into a user interface and clicking or activating a UI component such that the transaction is broadcast via the corresponding blockchain network via a node (e.g., a node 145) associated with the wallet. As used herein, "wallet" and "address" may be used interchangeably.

In some cases, the custodial token platform 110 may implement a transaction manager 185 that supports monitoring of one or more blockchains, such as the blockchain ledger 115, for incoming transactions associated with addresses managed by the custodial token platform 110 and creating and broadcasting on-blockchain transactions when a user or customer sends a digital asset (e.g., a withdrawal). For example, the transaction manager 185 may monitor the addressees of the customers for transfer of layer one or layer two tokens supported by the blockchain ledger 115 to the addresses managed by the custodial token platform 110. As another example, when a user is withdrawing a digital asset, such as a layer one or layer two token, to an external wallet (e.g., an address that is not managed by the custodial token platform 110 or an address for which the custodial token platform 110 does not have access to the associated private key), the transaction manager 185 may create and broadcast the transaction to one or more other nodes 145 of the blockchain network 105 in accordance with the blockchain application associated with the blockchain network 105. As such, the transaction manager 185, or an associated component of the custodial token platform 110 may function as a node 145 of the blockchain network 105.

As described herein, the custodial token platform may implement and support various wallets including the inbound wallets 165, the outbound wallets 170, and the cold wallets 150. Further, the custodial token platform 110 may implement techniques to maintain and manage balances of the various wallets. In some examples, the balances of the various wallets are configured to support security and liquidity. For example, the custodial token platform 110 may implement transactions that move crypto tokens between the inbound wallets 165 and the outbound wallets 170. These transactions may be referred to as "flush" transactions and may occur on a periodic or scheduled basis.

As described herein, various transactions may be broadcast to the blockchain ledger 115 to cause transfer of crypto tokens, to call smart contracts, to deploy smart contracts etc. In some examples, these transactions may also be referred to as messages. That is, the custodial token platform 110 may broadcast a message to the blockchain network 105 to cause transfer of tokens between wallets managed by the custodial token platform 110 to case transfer of tokens from a wallet managed by the custodial token platform 110 to an external wallet, to deploy a smart contract (e.g., a self-executing program), or to call a smart contract.

The custodial token platform 110 may additionally support an on-chain processing engine that supports a Web3 transactions. For example, the custodial token platform 110, which may function as an operator as described herein, may pass along details about a transfer (e.g., payment, transaction) to an on-chain smart contract (e.g., smart contract 130)), and the smart contract may reason (e.g., programmatically) about the details of the payment such that the payment is processed correctly. Using the techniques described herein, the custodial token platform 110 and the smart contract may support transfer of the correct amount of funds to a merchant in the merchant's designated settlement currency or token, which may remove crypto token volatility risk for merchants. For example, a buyer or sender may have a wallet that holds a highly volatile crypto token, and the merchant may not want to accept such a volatile token. Techniques described herein support seamless swap of the token to the desired settlement token of the merchant. Additionally, the techniques described herein support rejection of overpayments/underpayments to remove payment exceptions.

The smart contract may receive the payment details (e.g., from a client application on one of the computing devices 140) and execute a set of instructions to swap funds from the payer currency (e.g., token type) to the merchant settlement currency (e.g., token type) for the right amount, control which assets are acceptable, and reject payments that do not fulfill the requirements of the smart contract.

The message that includes the payment details may be referred to as a transfer intent (e.g., TransferIntent), because the message incudes the set of conditions or limitations for success of the payment/operation within the contract. The message may include information indicating what the smart contract is to do in the event of success (deliver to merchant) or failure (return to payer). The message may include a signature from the operator (e.g., the custodial token platform 110) facilitating the user of the contract (e.g., by the merchant) to ensure the security of the payment. The message may also include metadata used as a reference to off-chain data (e.g., either stored by the operator that generated the TransferIntent or some other requesting party).

The TransferIntent message my include off-chain generated input data that may be used to alter the behavior of the contract execution, and may provide verified attribute to off-chain metadata to a smart contract call. The TransferIntent message may also provide verifiable off-chain controls to prevent usage of a smart-contract in a way without on-chain contract data or an expensive call to an oracle. In some cases, the TransferIntent message may function as a deposit message for consumer custodial wallet use cases or a trade message for consumer decentralized exchange (DEX) trading. Thus, the techniques described herein support a verifiable Web2 generated input for Web3 execution pattern for smart contracts.

Figure 2:
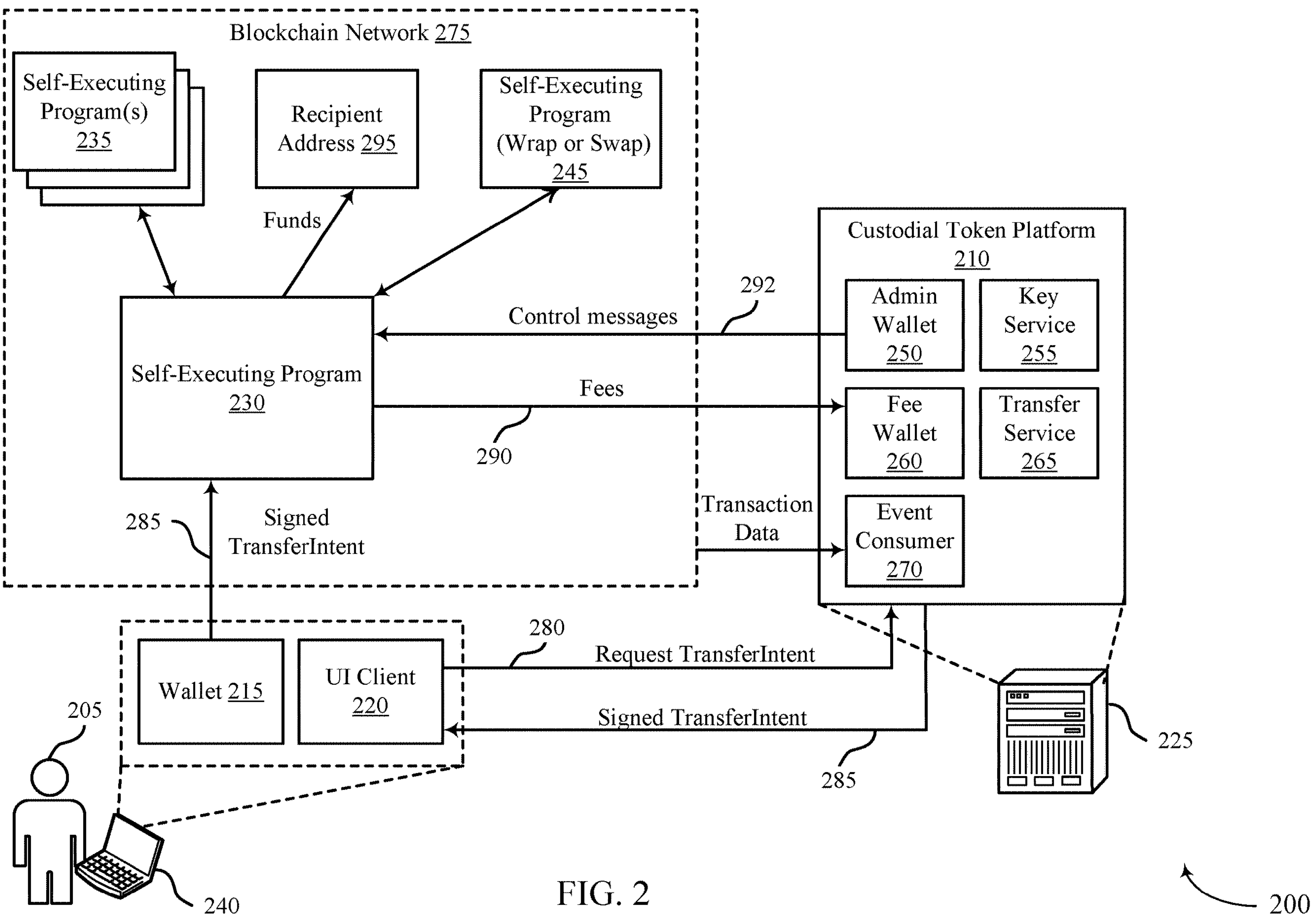
FIG. 2 illustrates an example of a computing environment that supports a Web3 transfer protocol in accordance with aspects of the present disclosure.

FIG. 2 illustrates an example of a computing environment 200 that supports a Web3 transfer protocol in accordance with aspects of the present disclosure. The computing environment 200 may implement aspects of the computing environment 100 of FIG. 1. For example, the computing environment 200 includes a custodial token platform 210, which may be an example of the custodial token platform 110 of FIG. 1. The computing environment 200 also includes a blockchain network 275, which may be an example of the blockchain network 105 of FIG. 1. The blockchain network 275 may support smart contracts, as described herein. As such, the blockchain network 275 may represent a plurality of computing nodes that support a blockchain distributed data store. In support of the blockchain distributed data store, the blockchain network may execute a virtual machine (e.g., an Ethereum virtual machine (EVM)) for execution of smart contracts, transactions, and the like.

A user may access a user device 240 (e.g., a computing device 140 of FIG. 1) to access one or more client applications, such as a wallet 215 and a user interface (UI) client 220, which may be configured to interact with the custodial token platform 210 and/or the blockchain network 275. In some examples, the wallet 215 is a custodial wallet, such that the user maintains and access the private key of the wallet 215. The wallet 215 may be an example of a browser wallet, a hardware wallet, an application wallet, or a combination thereof. The user may navigate to a Web3 interface or service associated with a merchant using a browser or application of the user device 240, and the user may wish to pay the merchant for a product or service using crypto tokens attributed to the wallet 215 via the blockchain distributed data store. However, the merchant may have a desired settlement token (target token) which the user may not have in the wallet 215. Thus, rather than the user 205 having to navigate to another exchange or swap service to swap the owned tokens for the target tokens, the techniques described herein support payment to the merchant using tokens owned by the user 205 (e.g., attributed to the wallet 215).

To support such transfers, the UI client 220 may be configured to communicate with the custodial token platform (e.g., an operator associated with self-executing program 230) to retrieve a transfer intent message and cause the wallet 215 to communicate the transfer intent message to the blockchain network 275, which may result in a transfer of funds. For example, the user 205 may navigate to a merchant or recipient service (e.g., a merchant website or website associated with the custodial token platform 210) via the user device 240. The user may indicate, via the user device, an intent to pay the merchant for a service or product. In response to the indication, the UI client 220 of the user device 240 may retrieve information associated with the wallet 215, such as the wallet address, crypto tokens associated with the wallet 215, etc. and information associated with the intended transaction, such as recipient address, target token type, amount to be received at the recipient address, etc. The UI client 220 may transmit a transfer intent request 280 to the custodial token platform 210. For example, the UI client 220 may transmit an object including the retrieved wallet information to an application programming interface (API) endpoint associated with the custodial token platform. In some examples, the merchant website or service may be configured (e.g., via the UI client 220) to interact with the custodial token platform 210 to support the techniques described herein. That is, the merchant website (or another website offering the merchant goods or services) may be configured to utilize the UI client 220 and the custodial token platform 210 for transaction processing.

In response to receiving the transfer intent request 280, the custodial token platform 210 may perform various verifications. For example, the custodial token platform 210 may verify that sender address is not on a blacklist and/or that the recipient address is authenticated by the custodial token platform 210. Additionally, the custodial token platform 210 may verify that the user has enough funds to cover the transaction. That is, the custodial token platform 210 may identify the crypto tokens associated with the wallet address of the wallet 215 and the amount of the crypto tokens associated with the wallet address. In some examples, this information is transmitted to the custodial token platform via the transfer intent request 280 by the UI client 220. Additionally, or alternatively, the information is retrieved from the blockchain distributed data store. That is, the custodial token platform 210 may determine the amount of crypto tokens attributed to the wallet address of the wallet 215 using public transaction/blockchain information.

In some examples, the custodial token platform 210 and/or the UI client 220 may recommend one or more transfer types. That is, based on the crypto tokens attributed to the wallet address of the wallet 215, the custodial token platform and/or the UI client 220 may identify transfer types. For example, if the user has a native token in the wallet 215, then the custodial token platform 210 may recommend a transfer using the native token. In other examples, if the custodial token platform has two different types of native tokens (e.g., associated with two different blockchain networks), then the custodial token platform 210 and/or the UI client 220 may recommend one of the native tokens for transfer over the other. Additionally, or alternatively, the custodial token platform 210 may recommend a swap of crypto token (for the target token) over a native token. In some cases, the UI client 220 may display a ranking of recommended transfer options for the user, and the user may select one of the transfer options. In response to selection, the request message (e.g., the transfer intent request 280) may be transmitted to the custodial token platform 210.

After validating such information and/or selection of the transfer option, the custodial token platform 210 may generate a message (e.g., a transferIntent) that includes information that is to be used by the self-executing program 230 to cause transfer. The custodial token platform 210 may sign the generated message using a key that is associated with the self-executing program 230 to generate a signed transferIntent message 285. The key may be retrieved from a key service 255 managed by the custodial token platform and the key may be an example of an operator key. The signed transferIntent message 285 may be returned to the UI client 220, and the UI client may cause the wallet 215 to broadcast a message that causes the signed message to be received by the self-executing program 230.

The signed message may include information that allows the self-executing program 230 to perform operations to cause the desired token (e.g., target token) and the desired amount to be transferred to the recipient address 295. The signed transferIntent message 285 may be passed to the self-executing program 230 as a struct calldata parameter and may include various different properties corresponding to information. For example, a transferIntent message may include a recipient amount, a deadline, a sender address, recipient address, recipient currency, refund address, a fee amount, an identifier, an operator, a signature, or a combination thereof. The recipient amount may be the amount of currency required for the payment, such as 100 USDC. The deadline may correspond to a time by which the payment is to be included within a block, which may prevent payments from confirming after sitting in the mempool for a long period. The deadline may be a time value that indicates a time stamp (e.g., hh:mm:ss), but may alternatively indicate a block number or block height. The recipient currency is the address of the currency in which the charge is to be priced. This identifier may be used to track payment progress. In some examples, the identifier is the size of a UUIDv4, and the custodial token platform 210 may store the identifier for payment tracking. The operator is the address of the operator (e.g., an address of the custodial token platform 210) who signed the payload. The signature is used to prevent tampering with the transfer intent, and may be calculated as follows: eth_sign(keccak_256(abi.encode(all,other,props)). The operator address should match the address recovered from the signature, as described in further detail herein.

The self-executing program 230 is deployed to the blockchain network 275 and may be configured to perform functions to facilitate transfer of crypto tokens from the wallet 215 to the recipient address 295 based on the information included in the transferIntent message 285. As described herein, the transferIntent message 285 may include information that the self-executing program 230 uses to facilitate such a transfer. For example, if the tokens attributed to the wallet 215 and the target crypto token are different, then the self-executing program 230 may determine to swap, exchange, wrap, unwrap, the crypto tokens attributed to the wallet to retrieve the desired crypto token. As such, the self-executing program 230 may be configured with various functions to perform these actions, and the action may depend on the type of token that is to be transferred from the wallet 215 (e.g., the source token) and the type of token to be received by recipient address 295 (e.g., based on the information included in the transferIntent message 285). The type of function used to transfer the desired token to the recipient address may be determined based on the following Table 1:

TABLE 1

| | Native | Wrapped | ERC-20 (A) | ERC-20 (B) |
|---|---|---|---|---|
| Native | transfer | wrapAndTransfer | swapAndTransfer | swapAndTransfer |
| Wrapped | unwrapAndTransfer | transfer | swapAndTransfer | swapAndTransfer |
| ERC-20(A) | swapAndTransfer | swapAndTransfer | transfer | swapAndTransfer |
| ERC-20(B) | swapAndTransfer | swapAndTransfer | swapAndTransfer | transfer |

If the transferIntent message indicates a native currency (e.g., ETH on the Ethereum blockchain or MATIC on Polygon), then the recipientCurrency field may be set to address(0). The refund address may correspond to an address to which to refund any funds. This address may be used for exchanges which may pool funds to provide a refund address of an individual user. The refund address may be used for payment reversal and may not be used to refund any excess from DEX swaps (as described in further detail herein). Instead, any excess may be returned to the message sender, such as the wallet address associated with the wallet 215.

The fee amount may be an amount of the fee that is sent to the operator, such as the custodial token platform 210. For example, after completion of a transfer, the self-executing program 230 may transfer fees 290 to a fee wallet 260 of the operator. The fee may be paid in the recipient currency. The fee amount may be included in the transfer intent as opposed to on-chain (e.g., in the self-executing program 23) to provide more flexibility. For example, some merchants may negotiate special fees or promotion based fees. The identifier included in the transfer intent message may be an example of metadata that corresponds to the charge (e.g., agreement between the payer and the merchant/recipient). As such, the metadata or identifier may reference the off-chain charge associated with the sender address and the recipient address.

In Table 1, the y-axis corresponds to the source token (e.g., the token to be transferred from the wallet 215), and the x-axis corresponds to the target token (e.g., the token to be received at the recipient address 295). Thus, if the source token is a token that is native to the blockchain (e.g., ETH on the Ethereum blockchain) and the target token is an ERC-20 token (e.g., a token minted by a smart contract on the Ethereum blockchain), then the self-executing program 230 may determine to swap the source token for the target token. In such cases, the self-executing program 230 may execute one or more functions (e.g., swapAndTransfer) to make a smart contract call to a different smart contract (e.g., self-executing program 245) associated with a DEX to swap the source token for the target token, and the target token is returned to the recipient address 295. When the source token is native and the target token is wrapped (e.g., wrapped ETH or WETH), then the self-executing program 230 may execute a function (e.g., wrapAndTransfer) to call a self-executing program 235 to wrap the source token to generate the target token, which is returned to the recipient address 295. If source and target token are the same, then the self-executing program 230 may execute a transfer function to transfer the token to the recipient address 295. If the source token is a wrapped token and the target token is a native token, then the self-executing program 230 may execute an unwrapAndTransfer function to call a self-executing program 235 to unwrap the source token to generate the target token, which is return to the recipient address 295.

In some cases, the functions may be different from the functions illustrated in Table 1. For example, different functions may be used to increase granularity. These different functions may include a function to transfer a native token (e.g., transferNative), a function to transfer an ERC20 token without a swap (e.g., transferToken), a function to wrap a native token and transfer (e.g., wrapAndTransfer), a function to unwrap a native token before transfer (e.g., unwrapAndTransfer). The functions may also include a function to swap an ERC20 token (e.g., or another type of Dapp token) for a native token before transfer (e.g., swap AndTansferUniswapV3Native). This function may be used to call the self-executing program 245 (e.g., DEX) to perform the token swap. The functions may also include a function to swap an ERC20 token for a different ERC20 token and transfer (e.g., swapAndTansferUniswapV3Token). Additional function types and combinations are contemplated within the scope of the present disclosure.

Thus, the self-executing program 230) is configured to acquire funds from a sender and distribute the funds to the recipient by generating one or more messages in response to receiving the transferIntent message 285. Further, the self-executing program 230 may be responsible for fee capture, preventing payment exceptions, and emitting events for off-chain reconciliation. The self-executing program 230) may not hold any funds on behalf of users, and may obtain a fee according to the signed transferIntent message 285 and return the fee to the operator, which is the custodial token platform 210 in the illustrated example. Thus, the operator may obtain fees on those transferIntent messages that are signed by the operator.

The custodial token platform 210 may maintain various services to support the techniques described herein. A transfer service 265 (also referred to as a swap service) may be used to interact with a DEX aggregator service to generate quotes (e.g., based on exchange rates or conversion ratios) and identify tokens that may be used to support payments. For example, after receiving an indication of tokens that are attributed to the address of the wallet 215, the transfer service 265 may reference the DEX aggregator to determine: (1) whether the source tokens are usable to swap to the target token to transfer to the recipient address 295; and (2) whether the wallet address has enough of the source tokens to cover the target funds. In such cases, the DEX aggregator may provide an exchange rate (e.g., conversion ratio) between one or more source tokens and the target token to determine whether the wallet has enough funds. Further, as described herein, the custodial token platform 210 may include a key service 255 that is used to manage user keys and/or platform keys, which may be used to sign transferIntents as an operator.

The custodial token platform 210 may also maintain one or more administrative wallets 250, which may be used to deploy and operate smart contracts, such as the self-executing program 230. For example, the administrative wallet 250 may be used to activate and/or pause the self-executing program 230, assign administrative rights regarding the self-executing program 230 to other wallets, etc. These functions may be performed using control messages 292 transmitted to the self-executing program 230 by the administrative wallet 250. The custodial token platform 210 may also use an event consumer service 270 that is used to monitor transaction data on the blockchain. For example, the event consumer service 270 may determine when a transfer corresponding to a signed transferIntent message is complete. The event consumer service 270 may maintain an internal data store of pending, complete, and/or failed transactions. Further, the event consumer service 270 may use the identifier (e.g., metadata) included in the transfer intent to monitor and document transactions occurring via the self-executing program 230.

Thus, the techniques described herein support a decentralized payment settlement that uses an operator to provide relevant and trusted information to settle a payment. That is, the self-executing program 230 may rely on the operator to provide information and verification of such information, and the self-executing program 230 may include instructions to process and settle the transfer based on the information provided by the operator.

Figure 3:
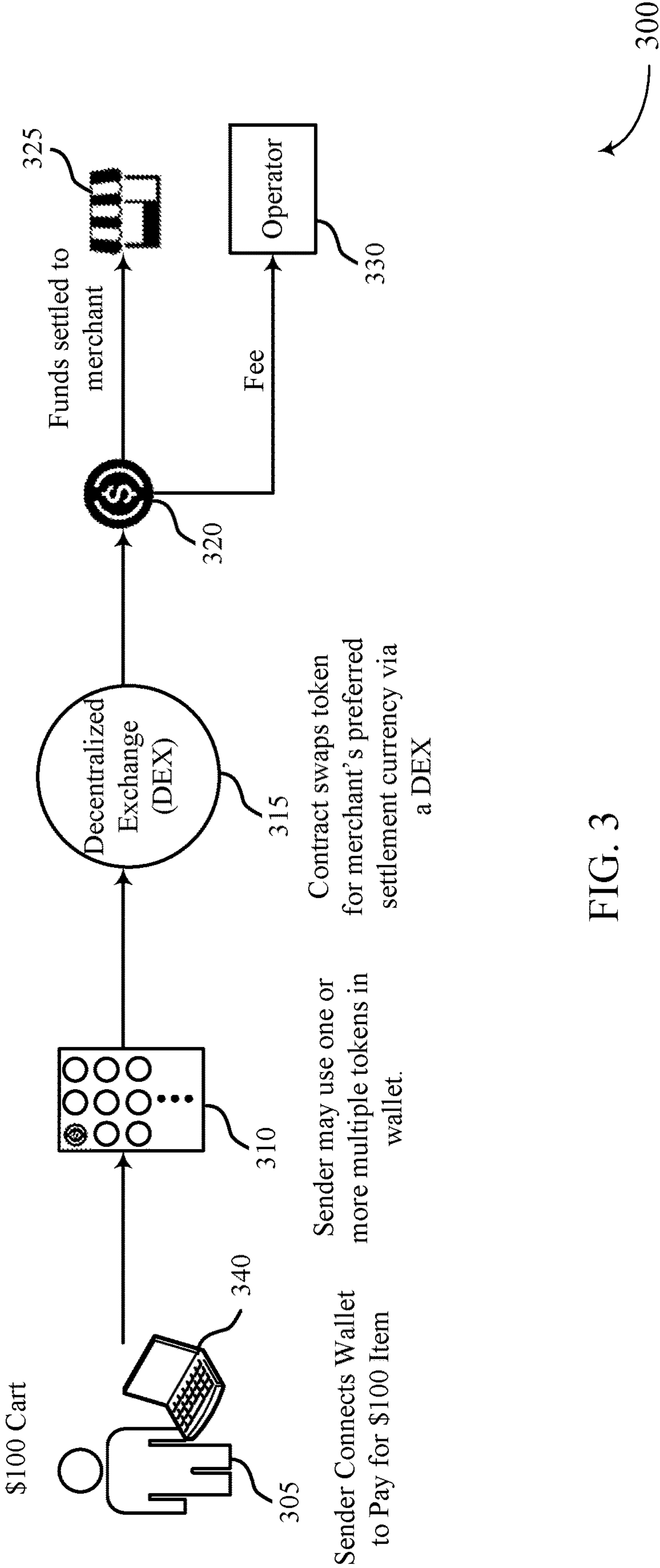
FIG. 3 illustrates an example of a diagram of a transfer protocol that supports a Web3 transfer protocol in accordance with aspects of the present disclosure.

FIG. 3 illustrates an example of a diagram 300 of a transfer protocol that supports a Web3 transfer protocol in accordance with aspects of the present disclosure. The diagram 300 of the transfer flow includes a user 305 with a user device 340, which may be an example of the user device as described herein. The user 305 may navigate to a webpage, service, product page, or application associated with a merchant 325, as described herein. The user 305 may add the product or service to a cart, and the product or service (hereinafter "item") has a cost of $100, for example.

Box 310 shows example crypto tokens that the user may use to pay the merchant. The crypto tokens may be native tokens to one or more blockchains, layer 2 tokens, non-native tokens (e.g., DAPP or contract supported tokens), non-fungible tokens, etc. The user 305 may select a token to use to transfer to the merchant 325. In some examples, the user 305 selects one or more transfer options from a list of recommended transfer options displayed at the user interface of the user device 340. A transfer request is transmitted to an operator 330, and a transfer intent message may be returned to the client application of the user device 340. The user may then select or approve the transfer using the user interface, and the transfer intent message is transmitted to the smart contract (e.g., self-executing program 230 of FIG. 2). In the illustrated example, the smart contract swaps the token for the preferred token of the merchant 325 using a DEX 315 (or swap services). The DEX 315 outputs a token 320, and a portion of the funds are settled to the merchant 325. A fee may be transferred to the operator 330.

Figure 4:
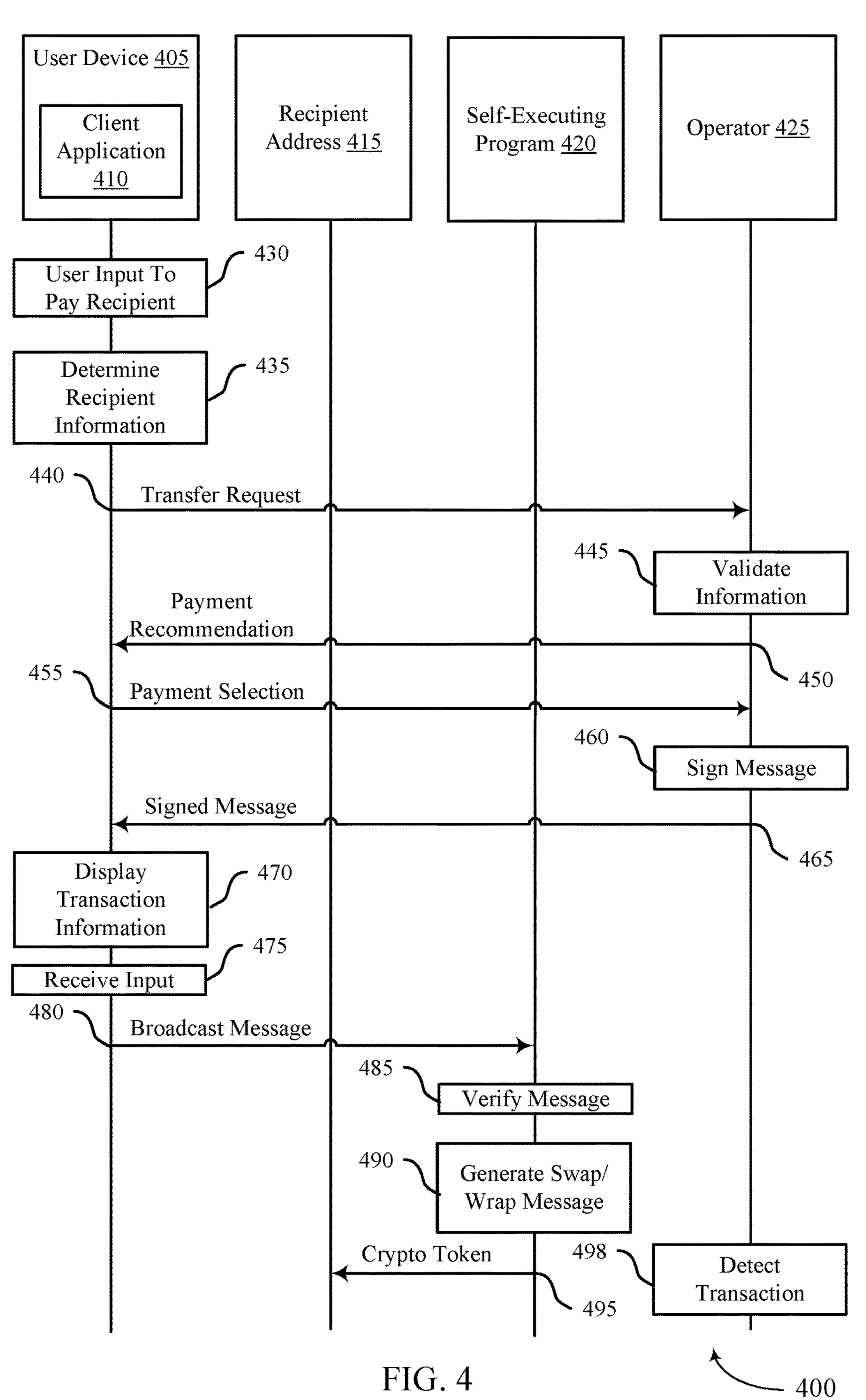
FIG. 4 illustrates an example of a process flow that supports a Web3 transfer protocol in accordance with aspects of the present disclosure.

FIG. 4 illustrates an example of a process flow 400 that supports a Web3 transfer protocol in accordance with aspects of the present disclosure. The process flow 400 includes a user device 405 with a client application 410, a recipient address 415, a self-executing program 420, and an operator 425, which may be examples of the corresponding devices and systems as described with respect to FIGS. 1 through 3. For example, the client application 410 may be an example of a wallet application as described herein. The operator 425 may be an example of or may be associated with a custodial token platform as described herein. Alternatively, the operator 425 may be associated with another device or system. In the following description of the process flow 400, the operations between devices and systems of process flow 400 may be transmitted in a different order than the example order shown, or the operations performed may be performed in different orders or at different times. Some operations may also be omitted from the process flow 400, and other operations may be added to the process flow 400.

At 430, the user device 405 may receive (e.g., via a user interface and/or the client application 410) user input to transfer pay a recipient (e.g., at the recipient address 415).

For example, the user may navigate to a website, service, DAPP, etc. and may select a UI component to pay the recipient for a product or service. At 435, the client application 410 may determine recipient information such as the recipient address 415, recipient token (e.g., the target token), payment amount, etc.

At 440, the client application 410 of the user device 405 may transmit, and the operator 425 may receive, a request to transfer a first amount of a first crypto token type from a sender address (e.g., associated with the client application 410) to a recipient address. The request may include an indication of a return address, the recipient amount, the recipient token, or other information. In some examples, the first message includes a second amount of a second crypto token type (e.g., the source token) to be transmitted by the transmitter (e.g., the client application 410) address. The transmitter address may be the sender address (e.g., the address that is sending the second crypto token).

At 445, the operator 425 may validate the sender address using off-chain data and a second amount of a second crypto token type associated with the sender address via a blockchain distributed data store. For example, the sender address may be checked against a list of blacklisted addresses or blocked addresses (e.g., sanctioned addresses). The list of blacklisted addresses may be maintained by the operator 425, an external service, or both. Verification of the second amount may include retrieving a conversion ratio between the second crypto token type and the first crypto token type. The conversion ratio (e.g., exchange rate) may be maintained by the operator 425 based on exchange data at the operator 425 and/or may be retrieved from an external data source, such as a DEX service, a DEX aggregator, etc. The operator 425 may also determine, using the conversion ratio, that a transfer of the second amount of the second crypto token type results in at least the first amount of the first crypto token type. That is, the operator 425 may determine whether the sender wallet has enough funds (based on the conversion ratio) to pay the recipient amount. In some examples, the operator 425 may determine whether a token is supported for transfer (e.g., whether the token is on a deny list). Thus, based on whether the sender address has enough funds or whether the funds correspond to one or more token types, the operator 425 may reject transfer intent requests.

At 450, the operator 425 may transmit and/or the client application 410 may display an indication of at least one recommended transfer type that is based at least in part on second amounts of one or more second crypto token types associated with the sender address via the blockchain distributed data store. Thus, the operator 425 or the client application 410 may retrieve the second amounts from the blockchain and make a payment recommendation to the user based on the second amounts. In some cases, native token payments may have priority over non-native tokens or ERC-20 tokens, as described herein. Additionally, or alternatively, low volatility tokens may have higher priority for payment than high volatility tokens.

At 455, the operator 425 may receive, from the client application 410, an indication of a selection of a transfer type of the at least one recommended transfer type.

At 460, the operator 425 may sign, using a public key associated with the operator, a message that includes an indication of the sender address, the recipient address, and the first amount of the first crypto token type. The signed message may be an example of a transfer intent. The signed message may also include a time value that indicates a time by which a message indicating a transfer of the first amount to the recipient address is to be included in a block on the blockchain distributed data store. Additionally, or alternatively, the signed message may include metadata that references an off-chain charge associated with the sender address and the recipient address.

At 465, the operator 425 may transmit, to the client application 410, the signed message.

At 470, the client application 410 may display, on the user device 405, transaction information associated with the received signed message. The transaction information may indicate the payment amount, recipient amount, respective token types, recipient address, return address, fees, etc. At 475, the client application 410 may receive an input accepting the transaction information.

At 480, in response to receiving the input, the client application 410 may broadcast, and the self-executing program 420 (stored on a blockchain distributed data store) may receive, a first message that includes indications of a sender address and a first amount of a first crypto token type to be received by a recipient address. The first message may include the signed transfer intent message received from the operator 425.

At 485, the self-executing program 420 may verify based at least in part on execution of the self-executing program 420 (e.g., in response to the received first message), that the first message is validly signed by the operator 425 (e.g., an operator 425) associated with the self-executing program. An indication of the operator (e.g., the public key) may be encoded in the self-executing program 420 or accessed by the self-executing program 420.

At 490, the self-executing program 420 may generate one or more second messages. For example, the self-executing program 420 may generate a swap message that is configured to swap a second amount of a second crypto token type that is attributed to the sender address in the blockchain distributed data store for the first amount of the first crypto token type. Additionally, or alternatively, the self-executing program 420 may generate the swap message that is configured to call a second self-executing program associated with a decentralized exchange protocol. In such cases, the second self-executing program swaps the second amount of the second crypto token type for the first amount of the first crypto token type, and returns the first amount of the first crypto token type to an address associated with the self-executing program. The swap message may include an indication of the first amount of the first crypto token type such that if the second amount is not enough, then the transaction fails. Additionally, or alternatively, the self-executing program 420 may generate a wrap message that is configured to wrap or unwrap a second amount of a second crypto token type resulting in the first amount of the first crypto token type. Thus, in response to receiving the message/transaction at 480, the self-executing program 420 may generate one or messages/transactions to carry out the transaction/message received at 480.

At 495, the target token (e.g., the first crypto token type) is transferred to the recipient address 415. For example, the self-executing program 420 broadcasts a transfer message that is configured to transfer the first amount of the first crypto token type to the recipient address. In other cases, the target token is transferred in response to the swap/wrap message by the corresponding self-executing program (e.g., DEX or wrapping service).

At 498, the operator 425 may detect, via the blockchain distributed data store, a message associated with the sender address that transfers the first amount of the first crypto token type to the recipient address. The operator 425 may execute an event consumer that monitors for transactions settlements. For example, the operator 425 may monitor the blockchain data store for transactions that include metadata corresponding to the charge.

Figure 5:
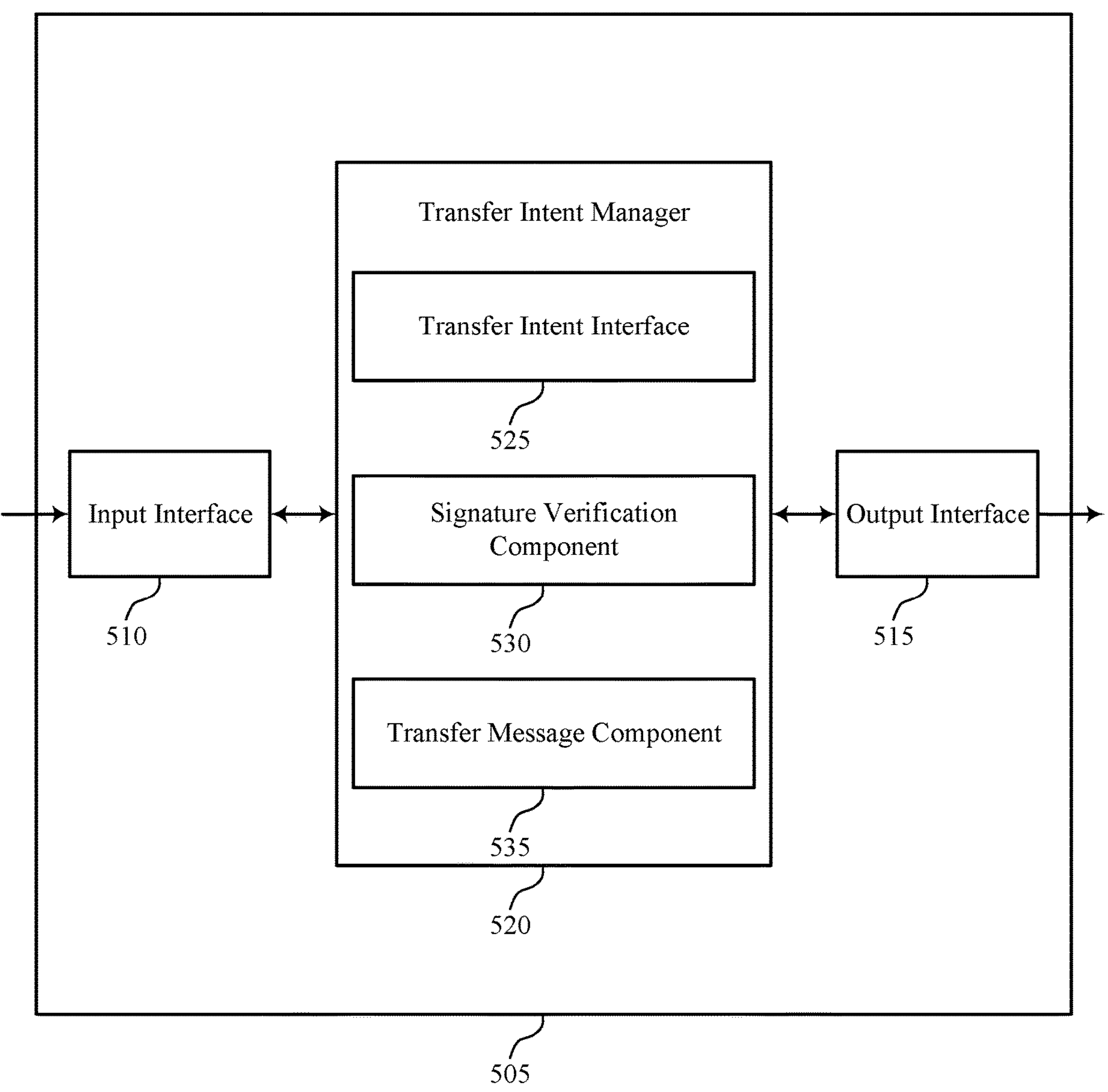
FIG. 5 illustrates a block diagram of an apparatus that supports a Web3 transfer protocol in accordance with aspects of the present disclosure.

FIG. 5 illustrates a block diagram 500 of a system 505 that supports a Web3 transfer protocol in accordance with aspects of the present disclosure. The system 505 may include an input interface 510, an output interface 515, and a transfer intent manager 520. The system 505 may also include a processor. Each of these components may be in communication with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, transactions, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the transfer intent manager 520 to support Web3 transfer protocol. In some cases, the input interface 510 may be a component of a network interface 725 as described with reference to FIG. 7.

The output interface 515 may manage output signaling for the system 505. For example, the output interface 515 may receive signaling from other components of the system 505, such as the transfer intent manager 520, and may transmit such output signaling corresponding to (e.g., representative of or otherwise based on) such signaling to other systems or devices. In some cases, the output interface 515 may be a component of a network interface 725 as described with reference to FIG. 7.

For example, the transfer intent manager 520 may include a transfer intent interface 525, a signature verification component 530, a transfer message component 535, or any combination thereof. In some examples, the transfer intent manager 520, or various components thereof, may be configured to perform various operations (e.g., receiving, monitoring, transmitting) using or otherwise in cooperation with the input interface 510, the output interface 515, or both. For example, the transfer intent manager 520 may receive information from the input interface 510, send information to the output interface 515, or be integrated in combination with the input interface 510, the output interface 515, or both to receive information, transmit information, or perform various other operations as described herein.

The transfer intent manager 520 may support data processing in accordance with examples as disclosed herein. The transfer intent interface 525 may be configured as or otherwise support a means for receiving, at a self-executing program stored on a blockchain distributed data store, a first message, the first message comprising indications of a sender address and a first amount of a first crypto token type to be received by a recipient address. The signature verification component 530 may be configured as or otherwise support a means for verifying, based at least in part on execution of the self-executing program, that the first message is validly signed by an operator associated with the self-executing program. The transfer message component 535 may be configured as or otherwise support a means for generating, after verifying that the first message is validly signed, one or more second messages that are configured to transfer the first amount of the first crypto token type to the recipient address.

Figure 6:
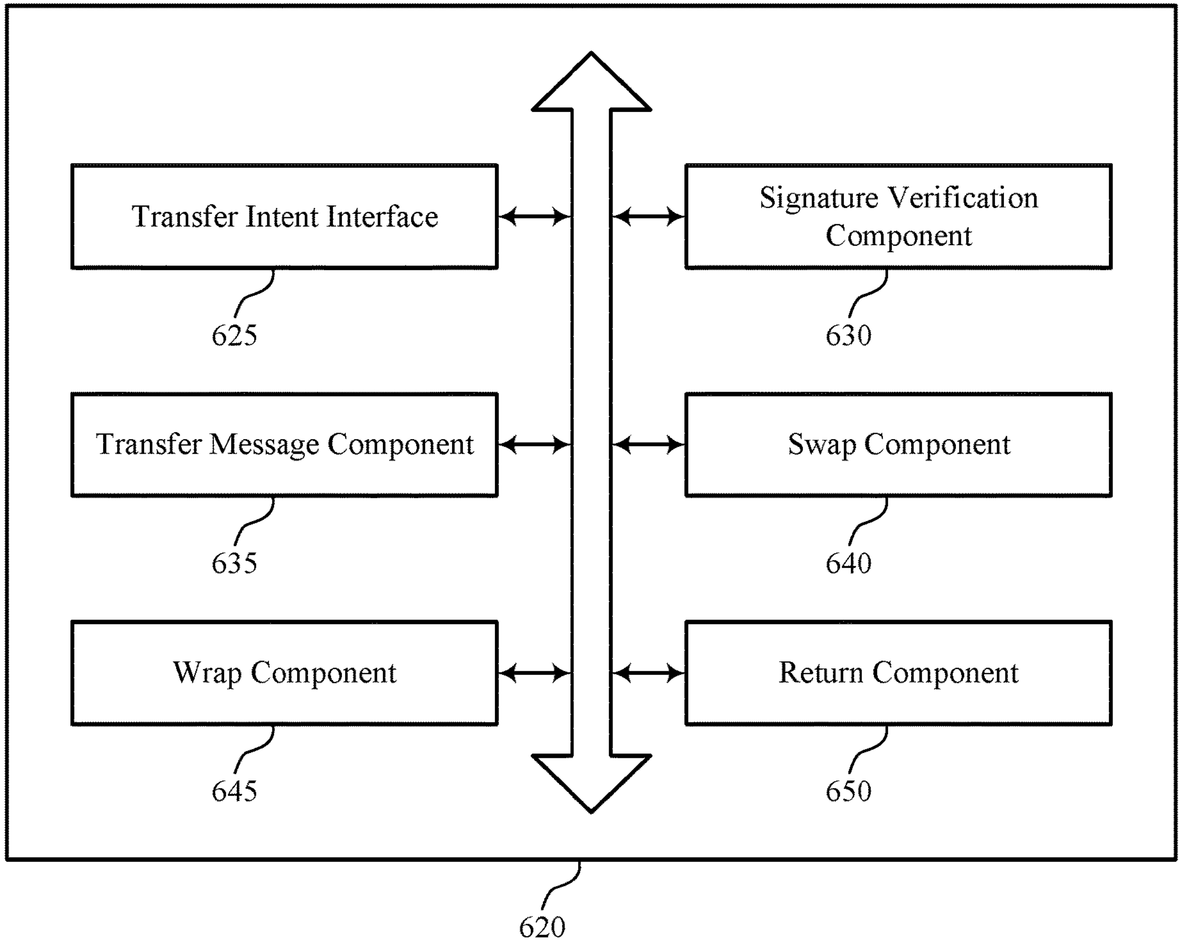
FIG. 6 illustrates a block diagram of a transfer intent manager that supports a Web3 transfer protocol in accordance with aspects of the present disclosure.

FIG. 6 illustrates a block diagram 600 of a transfer intent manager 620 that supports a Web3 transfer protocol in accordance with aspects of the present disclosure. The transfer intent manager 620 may be an example of aspects of a transfer intent manager or a transfer intent manager 520, or both, as described herein. The transfer intent manager 620, or various components thereof, may be an example of means for performing various aspects of Web3 transfer protocol as described herein. For example, the transfer intent manager 620 may include a transfer intent interface 625, a signature verification component 630, a transfer message component 635, a swap component 640, a wrap component 645, a return component 650, or any combination thereof. Each of these components may be in communication with one another (e.g., via one or more buses, communications links, communications interfaces, or any combination thereof).

The transfer intent manager 620 may support data processing in accordance with examples as disclosed herein. The transfer intent interface 625 may be configured as or otherwise support a means for receiving, at a self-executing program stored on a blockchain distributed data store, a first message, the first message comprising indications of a sender address and a first amount of a first crypto token type to be received by a recipient address. The signature verification component 630 may be configured as or otherwise support a means for verifying, based at least in part on execution of the self-executing program, that the first message is validly signed by an operator associated with the self-executing program. The transfer message component 635 may be configured as or otherwise support a means for generating, after verifying that the first message is validly signed, one or more second messages that are configured to transfer the first amount of the first crypto token type to the recipient address.

In some examples, to support generating the one or more second messages, the swap component 640 may be configured as or otherwise support a means for generating a swap message that is configured to swap a second amount of a second crypto token type that is attributed to the sender address in the blockchain distributed data store for the first amount of the first crypto token type. In some examples, to support generating the one or more second messages, the transfer message component 635 may be configured as or otherwise support a means for generating a transfer message that is configured to transfer the first amount of the first crypto token type to the recipient address.

In some examples, to support generating the swap message, the swap component 640 may be configured as or otherwise support a means for generating the swap message that is configured to call a second self-executing program associated with a decentralized exchange protocol, wherein the second self-executing program swaps the second amount of the second crypto token type for the first amount of the first crypto token type, and returns the first amount of the first crypto token type to an address associated with the self-executing program.

In some examples, to support generating the swap message, the swap component 640 may be configured as or otherwise support a means for generating the swap message that includes an indication of the first amount of the first crypto token type.

In some examples, to support generating the one or more second messages, the wrap component 645 may be configured as or otherwise support a means for generating a wrap message that is configured to wrap or unwrap a second amount of a second crypto token type resulting in the first amount of the first crypto token type. In some examples, to support generating the one or more second messages, the transfer message component 635 may be configured as or otherwise support a means for generating a transfer message that is configured to transfer the first amount of the first crypto token type to the recipient address.

In some examples, the return component 650 may be configured as or otherwise support a means for generating a third message that is configured to return a second amount of a second crypto token type to the sender address, the second amount based at least in part on a conversion ratio between the first crypto token type and the second crypto token type.

In some examples, the first message and the one or more second messages further comprise metadata that references an off-chain charge associated with the sender address and the recipient address.

In some examples, the first message includes a time value that indicates a time by which a message indicating the transfer of the first amount to the recipient address is to be included in a block on the blockchain distributed data store. In some examples, the self-executing program is configured to verify the time value before generating the one or more second messages. In some examples, the first message includes a fee amount that is to be transmitted to the operator.

In some examples, the first message includes a second amount of a second crypto token type to be transmitted by a transmitter address that transmits the first message.

Figure 7:
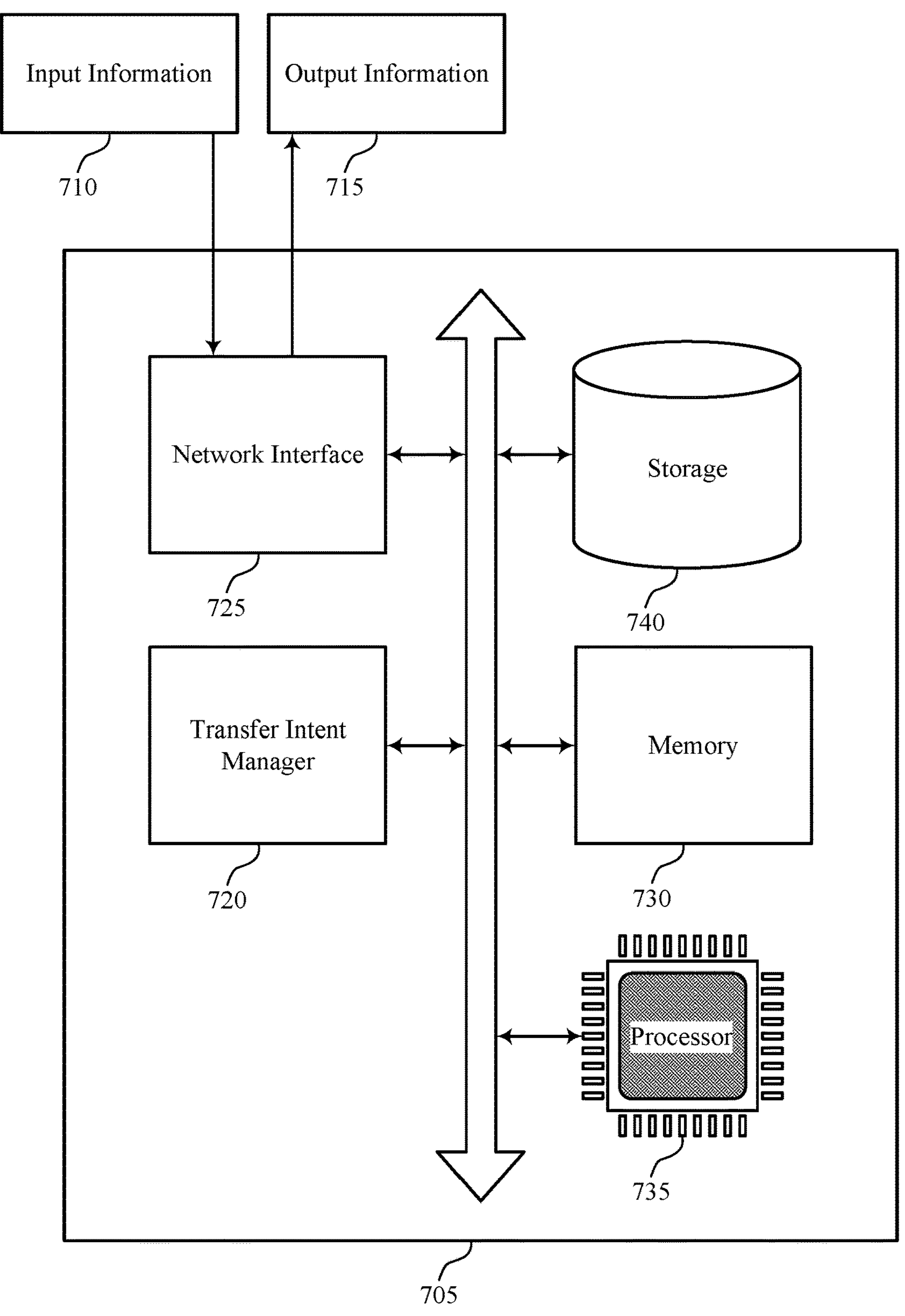
FIG. 7 illustrates a diagram of a system including a device that supports a Web3 transfer protocol in accordance with aspects of the present disclosure.

FIG. 7 illustrates a diagram of a system 700 including a system 705 that supports a Web3 transfer protocol in accordance with aspects of the present disclosure. The system 705 may be an example of or include the components of a system 505 as described herein. The system 705 may include components supporting blockchain services and interaction, such as a transfer intent manager 720, an input information 710, an output information 715, a network interface 725, a memory 730, a processor 735, and a storage 740. Each of these components may be in communication with one another (e.g., via one or more buses, communications links, communications interfaces, or any combination thereof).

The network interface 725 may enable the system 705 to exchange information (e.g., input information 710, output information 715, or both) with other systems or devices (not shown). For example, the network interface 725 may enable the system 705 to connect to a network (e.g., a network 135 as described herein). The network interface 725 may include one or more wireless network interfaces, one or more wired network interfaces, or any combination thereof.

Memory 730 may include RAM, ROM, or both. The memory 730 may store computer-readable, computer-executable software including instructions that, when executed, cause the processor 735 to perform various functions described herein, such as functions supporting Web3 transfer protocol. In some cases, the memory 730 may contain, among other things, a basic input/output system (BIOS), which may control basic hardware or software operation such as the interaction with peripheral components or devices. In some cases, the memory 730 may be an example of aspects of one or more components of a custodial token platform 110 as described with reference to FIG. 1.

The processor 735 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 735 may be configured to execute computer-readable instructions stored in a memory 730 to perform various functions (e.g., functions or tasks supporting Web3 transfer protocol). Though a single processor 735 is depicted in the example of FIG. 7, it is to be understood that the system 705 may include any quantity of one or more of processors 735 and that a group of processors 735 may collectively perform one or more functions ascribed herein to a processor, such as the processor 735.

Storage 740 may be configured to store data that is generated, processed, stored, or otherwise used by the system 705. In some cases, the storage 740 may include one or more HDDs, one or more SDDs, or both. In some examples, the storage 740 may be an example of a single database, a distributed database, multiple distributed databases, a data store, a data lake, or an emergency backup database.

The transfer intent manager 720 may support data processing in accordance with examples as disclosed herein. For example, the transfer intent manager 720 may be configured as or otherwise support a means for receiving, at a self-executing program stored on a blockchain distributed data store, a first message, the first message comprising indications of a sender address and a first amount of a first crypto token type to be received by a recipient address. The transfer intent manager 720 may be configured as or otherwise support a means for verifying, based at least in part on execution of the self-executing program, that the first message is validly signed by an operator associated with the self-executing program. The transfer intent manager 720 may be configured as or otherwise support a means for generating, after verifying that the first message is validly signed, one or more second messages that are configured to transfer the first amount of the first crypto token type to the recipient address.

By including or configuring the transfer intent manager 720 in accordance with examples as described herein, the system 705 may support techniques for reduced processing by blockchain nodes by reducing external data calls (e.g., via oracles), which include significant processor and resource overhead.

Figure 8:
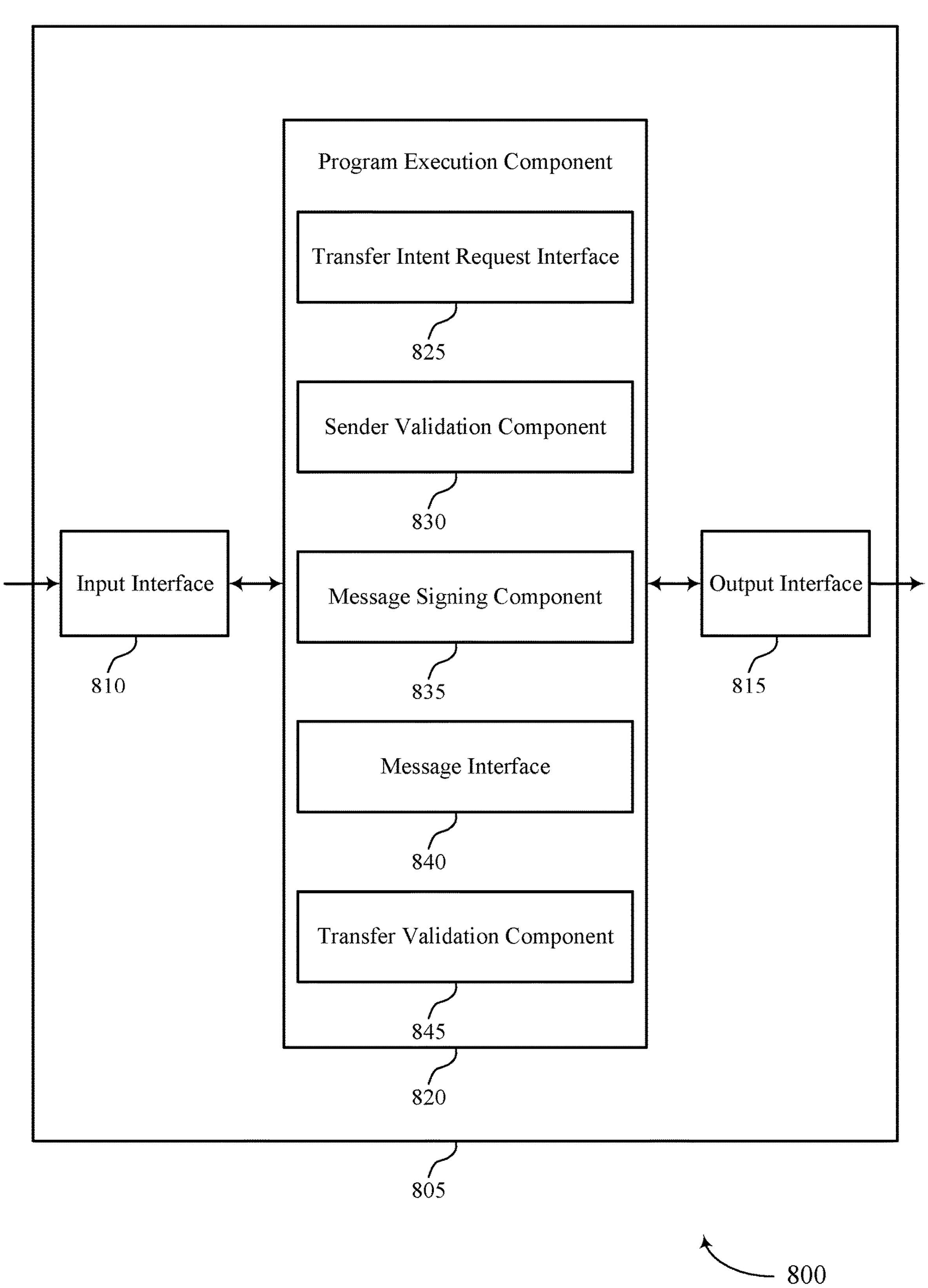
FIG. 8 illustrates a block diagram of an apparatus that supports a Web3 transfer protocol in accordance with aspects of the present disclosure.

FIG. 8 illustrates a block diagram 800 of a system 805 that supports a Web3 transfer protocol in accordance with aspects of the present disclosure. The system 805 may include an input interface 810, an output interface 815, and a program execution component 820. The system 805 may also include a processor. Each of these components may be in communication with one another (e.g., via one or more buses, communications links, communications interfaces, or any combination thereof).

The input interface 810 may manage input signaling for the system 805. For example, the input interface 810 may receive input signaling (e.g., messages, packets, data, instructions, commands, or any other form of encoded information) from other systems or devices. The input interface 810 may send signaling corresponding to (e.g., representative of or otherwise based on) such input signaling to other components of the system 805 for processing. The input interface 810 may send aspects of these input signals to other components of the system 805 for processing. For example, the input interface 810 may transmit such corresponding signaling to the program execution component 820 to support Web3 transfer protocol. In some cases, the input interface 810 may be a component of a network interface 1010 as described with reference to FIG. 10.

The output interface 815 may manage output signaling for the system 805. For example, the output interface 815 may receive signaling from other components of the system 805, such as the program execution component 820, and may transmit such output signaling corresponding to (e.g., representative of or otherwise based on) such signaling to other systems or devices. In some cases, the input interface 810 may be a component of a network interface 1010 as described with reference to FIG. 10.

The program execution component 820 may include a transfer intent request interface 825, a sender validation component 830, a message signing component 835, a message interface 840, a transfer validation component 845, or any combination thereof. In some examples, the program execution component 820, or various components thereof, may be configured to perform various operations (e.g., receiving, monitoring, transmitting) using or otherwise in cooperation with the input interface 810, the output interface 815, or both. For example, the program execution component 820 may receive information from the input interface 810, send information to the output interface 815, or be integrated in combination with the input interface 810, the output interface 815, or both to receive information, transmit information, or perform various other operations as described herein.

The program execution component 820 may support data processing in accordance with examples as disclosed herein. The transfer intent request interface 825 may be configured as or otherwise support a means for receiving, from a client application and at an operator, a request to transfer a first amount of a first crypto token type from a sender address to a recipient address. The sender validation component 830 may be configured as or otherwise support a means for validating the sender address using off-chain data and a second amount of a second crypto token type associated with the sender address via a blockchain distributed data store. The message signing component 835 may be configured as or otherwise support a means for signing, using a public key associated with the operator, a message that includes an indication of the sender address, the recipient address, and the first amount of the first crypto token type. The message interface 840 may be configured as or otherwise support a means for transmitting, to the client application, the signed message. The transfer validation component 845 may be configured as or otherwise support a means for detecting, via the blockchain distributed data store, a message associated with the sender address that transfers the first amount of the first crypto token type to the recipient address.

Figure 9:
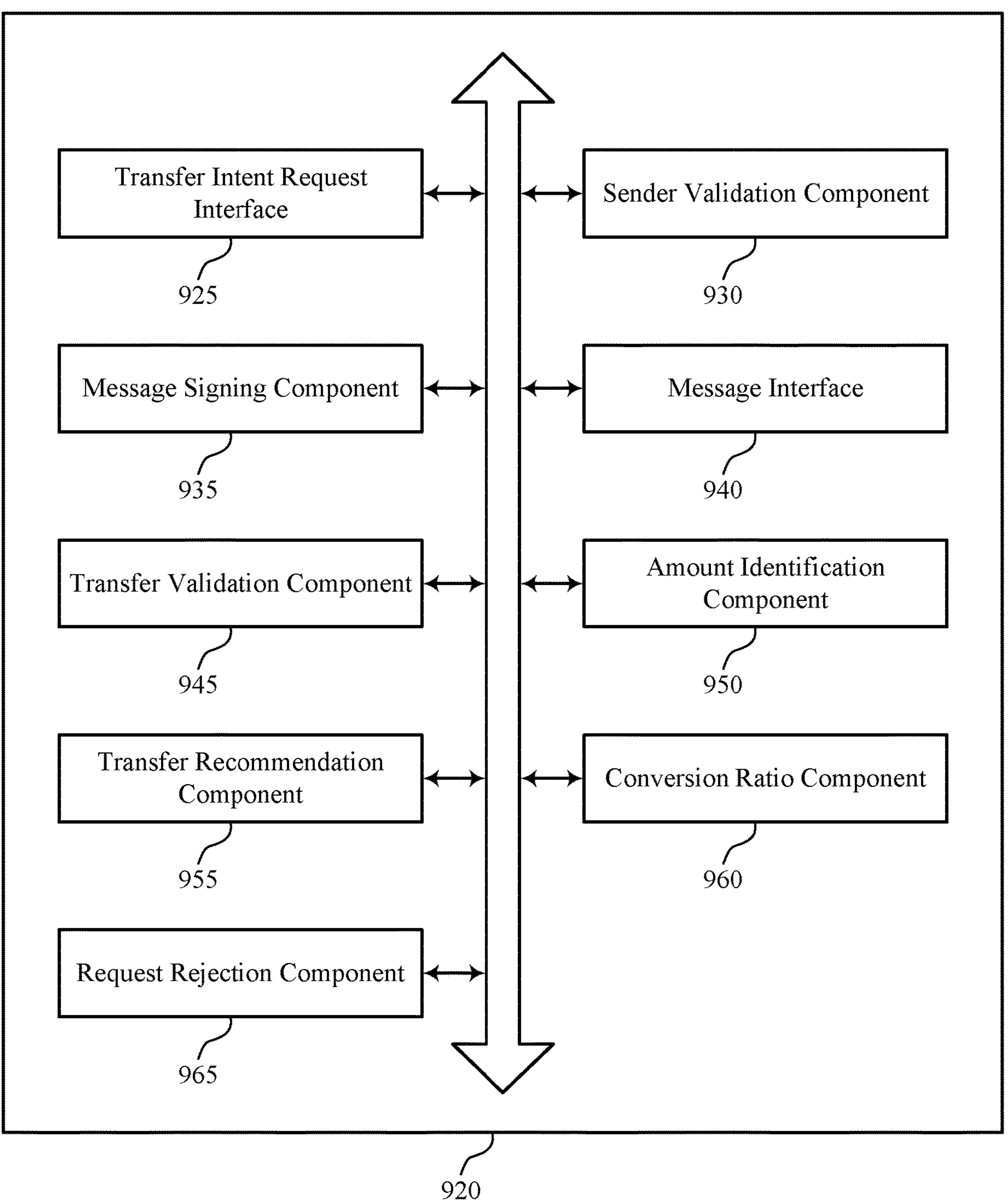
FIG. 9 illustrates a block diagram of a program execution component that supports a Web3 transfer protocol in accordance with aspects of the present disclosure.

FIG. 9 illustrates a block diagram 900 of a program execution component 920 that supports a Web3 transfer protocol in accordance with aspects of the present disclosure. The program execution component 920 may be an example of aspects of a program execution component or a program execution component 820, or both, as described herein. The program execution component 920, or various components thereof, may be an example of means for performing various aspects of Web3 transfer protocol as described herein. For example, the program execution component 920 may include a transfer intent request interface 925, a sender validation component 930, a message signing component 935, a message interface 940, a transfer validation component 945, an amount identification component 950), a transfer recommendation component 955, a conversion ratio component 960, a request rejection component 965, or any combination thereof. Each of these components may be in communication with one another (e.g., via one or more buses, communications links, communications interfaces, or any combination thereof).

The program execution component 920 may support data processing in accordance with examples as disclosed herein. The transfer intent request interface 925 may be configured as or otherwise support a means for receiving, from a client application and at an operator, a request to transfer a first amount of a first crypto token type from a sender address to a recipient address. The sender validation component 930 may be configured as or otherwise support a means for validating the sender address using off-chain data and a second amount of a second crypto token type associated with the sender address via a blockchain distributed data store. The message signing component 935 may be configured as or otherwise support a means for signing, using a public key associated with the operator, a message that includes an indication of the sender address, the recipient address, and the first amount of the first crypto token type. The message interface 940 may be configured as or otherwise support a means for transmitting, to the client application, the signed message. The transfer validation component 945 may be configured as or otherwise support a means for detecting, via the blockchain distributed data store, a message associated with the sender address that transfers the first amount of the first crypto token type to the recipient address.

In some examples, the amount identification component 950 may be configured as or otherwise support a means for retrieving respective second amounts of one or more second crypto token types associated with the sender address via the blockchain distributed data store. In some examples, the transfer recommendation component 955 may be configured as or otherwise support a means for transmitting, to the client application, an indication of at least one recommended transfer type that is based at least in part on the respective second amounts. In some examples, the transfer recommendation component 955 may be configured as or otherwise support a means for receiving, from the client application, an indication of a selection of a transfer type of the at least one recommended transfer type, wherein the message is signed after receiving the selection.

In some examples, to support validating the second amount of the second crypto token type, the conversion ratio component 960 may be configured as or otherwise support a means for retrieving a conversion ratio between the second crypto token type and the first crypto token type. In some examples, to support validating the second amount of the second crypto token type, the sender validation component 930 may be configured as or otherwise support a means for determining, using the conversion ratio, that a transfer of the second amount of the second crypto token type results in at least the first amount of the first crypto token type, wherein the message is signed based at least in part on the determining.

In some examples, the request includes an indication of a return address and the signed message includes an indication of the return address.

In some examples, to support signing the message, the message signing component 935 may be configured as or otherwise support a means for signing the message that includes a time value that indicates a time by which a message indicating a transfer of the first amount to the recipient address is to be included in a block on the blockchain distributed data store.

In some examples, to support signing the message, the message signing component 935 may be configured as or otherwise support a means for signing the message that includes metadata that references an off-chain charge associated with the sender address and the recipient address.

In some examples, the transfer intent request interface 925 may be configured as or otherwise support a means for receiving a second request to transfer a second amount of a second crypto token type from a second sender address to a second recipient address. In some examples, the request rejection component 965 may be configured as or otherwise support a means for rejecting the second request based at least in part on the second recipient address or a third crypto token type attributed to the second sender address via the blockchain distributed data store.

In some examples, to support rejecting the second request, the message interface 940 may be configured as or otherwise support a means for transmitting, to the client application, an indication that the request is rejected, refraining from signing a second message, or both.

Figure 10:
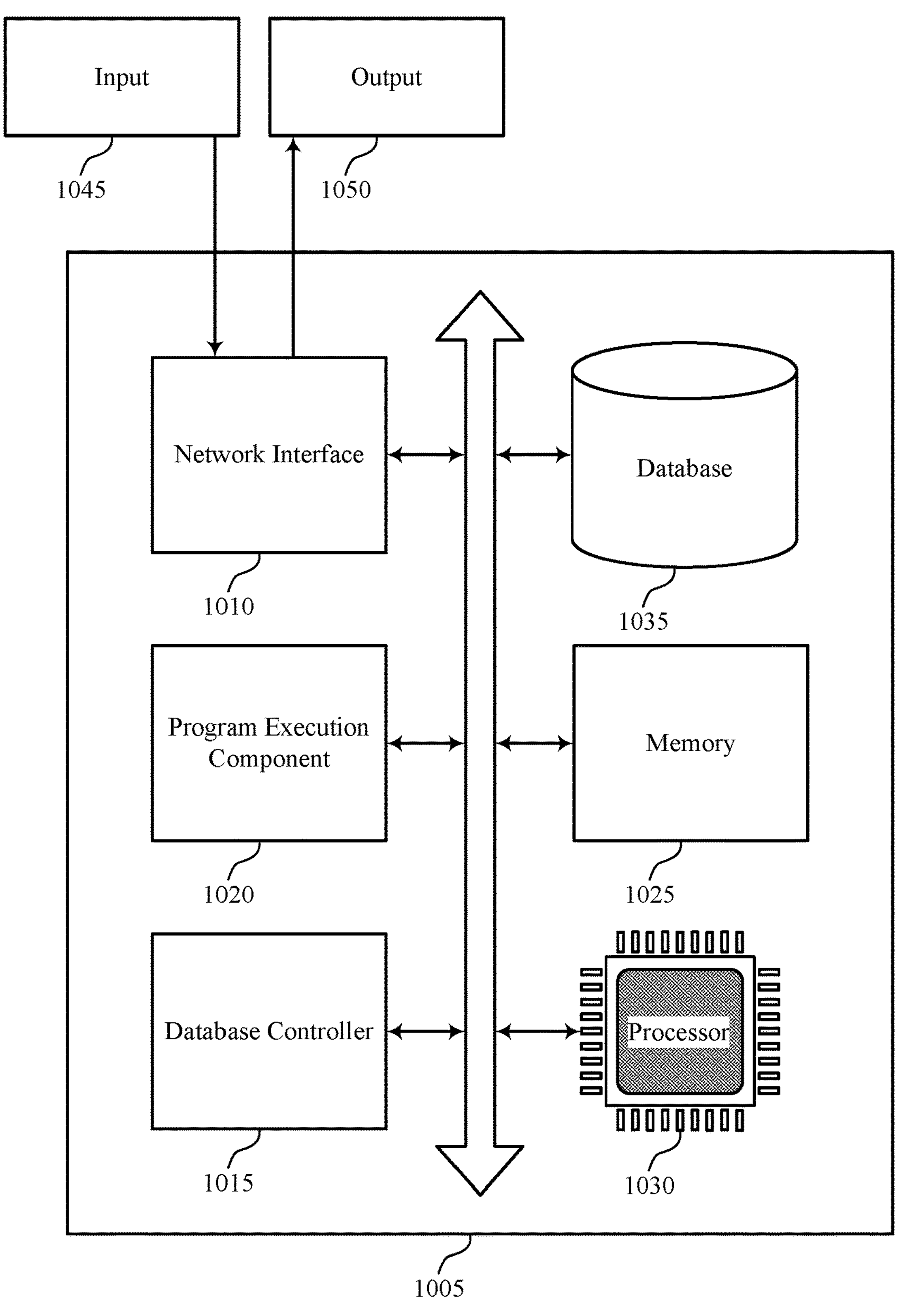
FIG. 10 illustrates a diagram of a system including a device that supports a Web3 transfer protocol in accordance with aspects of the present disclosure.

FIG. 10 illustrates a diagram of a system 1000 including a device 1005 that supports a Web3 transfer protocol in accordance with aspects of the present disclosure. The device 1005 may be an example of or include the components of a system 805 as described herein. The device 1005 may include components for blockchain protocol execution, such as a program execution component 1020, an network interface 1010, a database controller 1015, a memory 1025, a processor 1030, and a database 1035. Each of these components may be in communication with one another (e.g., via one or more buses, communications links, communications interfaces, or any combination thereof). In some examples, the system 1000 or the device 1005 may correspond to or represent aspects of a node of a blockchain network, such as a node 145 of FIG. 1.

The network interface 1010 may manage input signals 1045 and output signals 1050 for the device 1005. The network interface 1010 may also manage peripherals not integrated into the device 1005. In some cases, the network interface 1010 may represent a physical connection or port to an external peripheral. In some cases, the network interface 1010 may utilize an operating system such as iOS®, ANDROID®, MS-DOS®, MS-WINDOWS®, OS/2®, UNIX®, LINUX®, or another known operating system. In other cases, the network interface 1010 may represent or interact with a modem, a keyboard, a mouse, a touchscreen, or a similar device. In some cases, the network interface 1010 may be implemented as part of a processor 1030. In some examples, a user may interact with the device 1005 via the network interface 1010 or via hardware components controlled by the network interface 1010.

The database controller 1015 may manage data storage and processing in a database 1035. In some cases, a user may interact with the database controller 1015. In other cases, the database controller 1015 may operate automatically without user interaction. The database 1035 may be an example of a single database, a distributed database, multiple distributed databases, a data store, a data lake, or an emergency backup database.

Memory 1025 may include RAM and ROM. The memory 1025 may store computer-readable, computer-executable software including instructions that, when executed, cause the processor 1030 to perform various functions described herein. In some cases, the memory 1025 may contain, among other things, a BIOS which may control basic hardware or software operation such as the interaction with peripheral components or devices.

The processor 1030 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1030 may be configured to operate a memory array using a memory controller. In other cases, a memory controller may be integrated into the processor 1030. The processor 1030 may be configured to execute computer-readable instructions stored in a memory 1025 to perform various functions (e.g., functions or tasks supporting Web3 transfer protocol).

The program execution component 1020 may support data processing in accordance with examples as disclosed herein. For example, the program execution component 1020 may be configured as or otherwise support a means for receiving, from a client application and at an operator, a request to transfer a first amount of a first crypto token type from a sender address to a recipient address. The program execution component 1020 may be configured as or otherwise support a means for validating the sender address using off-chain data and a second amount of a second crypto token type associated with the sender address via a blockchain distributed data store. The program execution component 1020 may be configured as or otherwise support a means for signing, using a public key associated with the operator, a message that includes an indication of the sender address, the recipient address, and the first amount of the first crypto token type. The program execution component 1020 may be configured as or otherwise support a means for transmitting, to the client application, the signed message. The program execution component 1020 may be configured as or otherwise support a means for detecting, via the blockchain distributed data store, a message associated with the sender address that transfers the first amount of the first crypto token type to the recipient address.

The program execution component 1020 may be an example of aspects of a virtual machine or operating system that executes a blockchain protocol, such as the EVM. Thus, the program execution component 1020 may include instructions for a smart contract or self-executing program and may execute such instructions based on transactions or messages received from other devices or systems.

Figure 11:
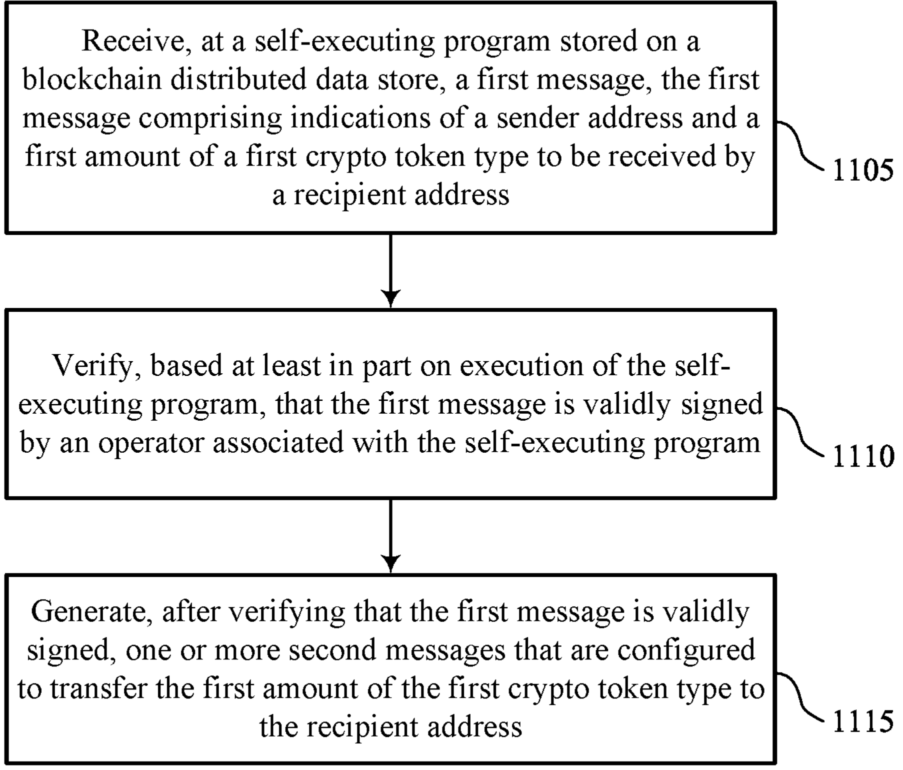
FIGS. 11 through 16 illustrate flowcharts showing methods that support Web3 transfer protocol in accordance with aspects of the present disclosure.

FIG. 11 illustrates a flowchart showing a method 1100 that supports a Web3 transfer protocol in accordance with aspects of the present disclosure. The operations of the method 1100 may be implemented by a custodial token platform or its components as described herein. For example, the operations of the method 1100 may be performed by a custodial token platform as described with reference to FIGS. 1 through 7. In some examples, a custodial token platform may execute a set of instructions to control the functional elements of the custodial token platform to perform the described functions. Additionally, or alternatively, the custodial token platform may perform aspects of the described functions using special-purpose hardware.

At 1105, the method may include receiving, at a self-executing program stored on a blockchain distributed data store, a first message, the first message comprising indications of a sender address and a first amount of a first crypto token type to be received by a recipient address. The operations of 1105 may be performed in accordance with examples as disclosed herein. In some examples, aspects of the operations of 1105 may be performed by a transfer intent interface 625 as described with reference to FIG. 6.

At 1110, the method may include verifying, based at least in part on execution of the self-executing program, that the first message is validly signed by an operator associated with the self-executing program. The operations of 1110 may be performed in accordance with examples as disclosed herein. In some examples, aspects of the operations of 1110 may be performed by a signature verification component 630 as described with reference to FIG. 6.

At 1115, the method may include generating, after verifying that the first message is validly signed, one or more second messages that are configured to transfer the first amount of the first crypto token type to the recipient address. The operations of 1115 may be performed in accordance with examples as disclosed herein. In some examples, aspects of the operations of 1115 may be performed by a transfer message component 635 as described with reference to FIG. 6.

Figure 12:
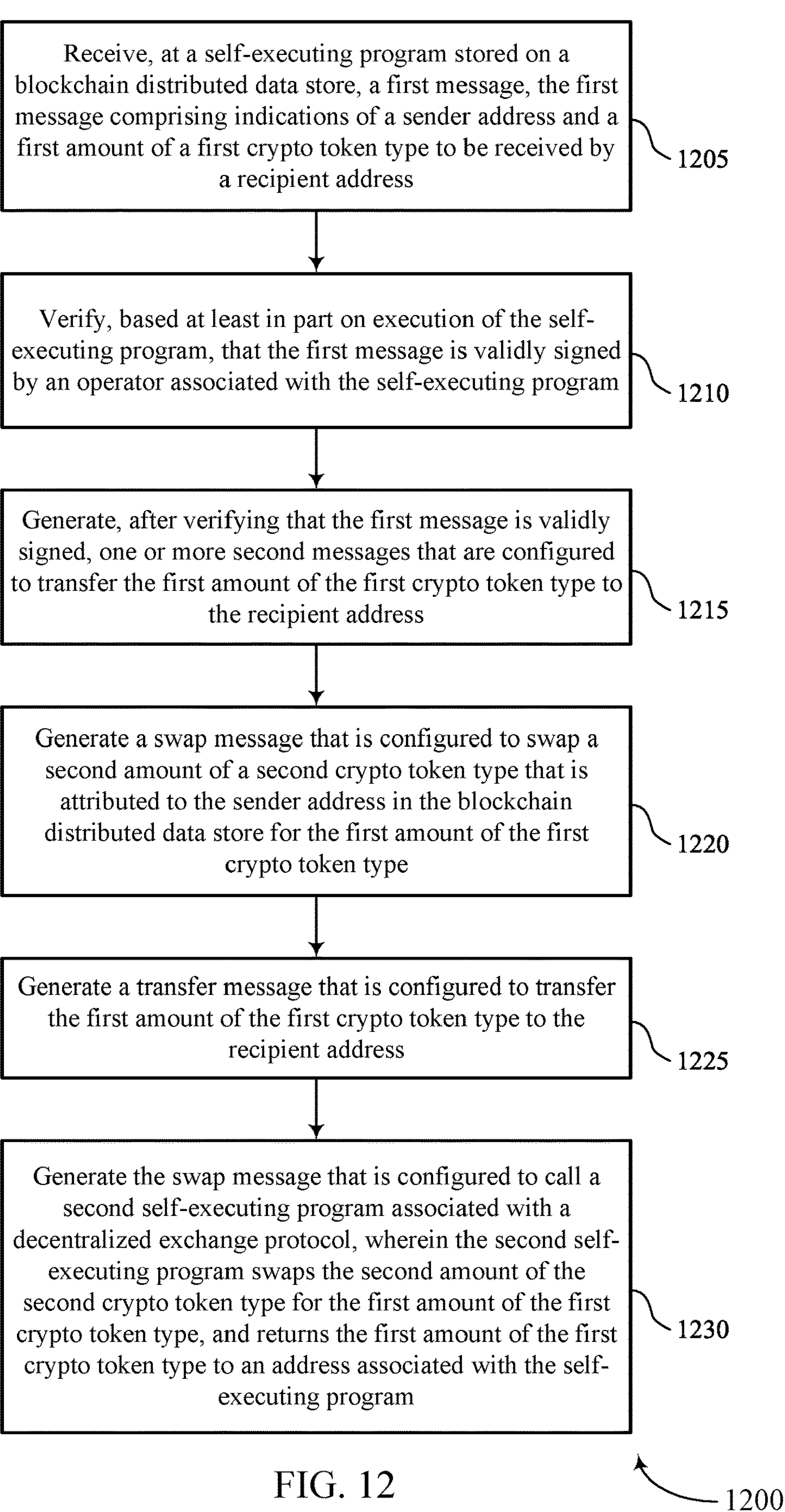

FIG. 12 illustrates a flowchart showing a method 1200 that supports a Web3 transfer protocol in accordance with aspects of the present disclosure. The operations of the method 1200 may be implemented by a custodial token platform or its components as described herein. For example, the operations of the method 1200 may be performed by a custodial token platform as described with reference to FIGS. 1 through 7. In some examples, a custodial token platform may execute a set of instructions to control the functional elements of the custodial token platform to perform the described functions. Additionally, or alternatively, the custodial token platform may perform aspects of the described functions using special-purpose hardware.

At 1205, the method may include receiving, at a self-executing program stored on a blockchain distributed data store, a first message, the first message comprising indications of a sender address and a first amount of a first crypto token type to be received by a recipient address. The operations of 1205 may be performed in accordance with examples as disclosed herein. In some examples, aspects of the operations of 1205 may be performed by a transfer intent interface 625 as described with reference to FIG. 6.

At 1210, the method may include verifying, based at least in part on execution of the self-executing program, that the first message is validly signed by an operator associated with the self-executing program. The operations of 1210 may be performed in accordance with examples as disclosed herein. In some examples, aspects of the operations of 1210 may be performed by a signature verification component 630 as described with reference to FIG. 6.

At 1215, the method may include generating, after verifying that the first message is validly signed, one or more second messages that are configured to transfer the first amount of the first crypto token type to the recipient address. The operations of 1215 may be performed in accordance with examples as disclosed herein. In some examples, aspects of the operations of 1215 may be performed by a transfer message component 635 as described with reference to FIG. 6.

At 1220, the method may include generating a swap message that is configured to swap a second amount of a second crypto token type that is attributed to the sender address in the blockchain distributed data store for the first amount of the first crypto token type. The operations of 1220 may be performed in accordance with examples as disclosed herein. In some examples, aspects of the operations of 1220 may be performed by a swap component 640 as described with reference to FIG. 6.

At 1225, the method may include generating a transfer message that is configured to transfer the first amount of the first crypto token type to the recipient address. The operations of 1225 may be performed in accordance with examples as disclosed herein. In some examples, aspects of the operations of 1225 may be performed by a transfer message component 635 as described with reference to FIG. 6.

At 1230, the method may include generating the swap message that is configured to call a second self-executing program associated with a decentralized exchange protocol, wherein the second self-executing program swaps the second amount of the second crypto token type for the first amount of the first crypto token type, and returns the first amount of the first crypto token type to an address associated with the self-executing program. The operations of 1230 may be performed in accordance with examples as disclosed herein. In some examples, aspects of the operations of 1230 may be performed by a swap component 640 as described with reference to FIG. 6.

Figure 13:
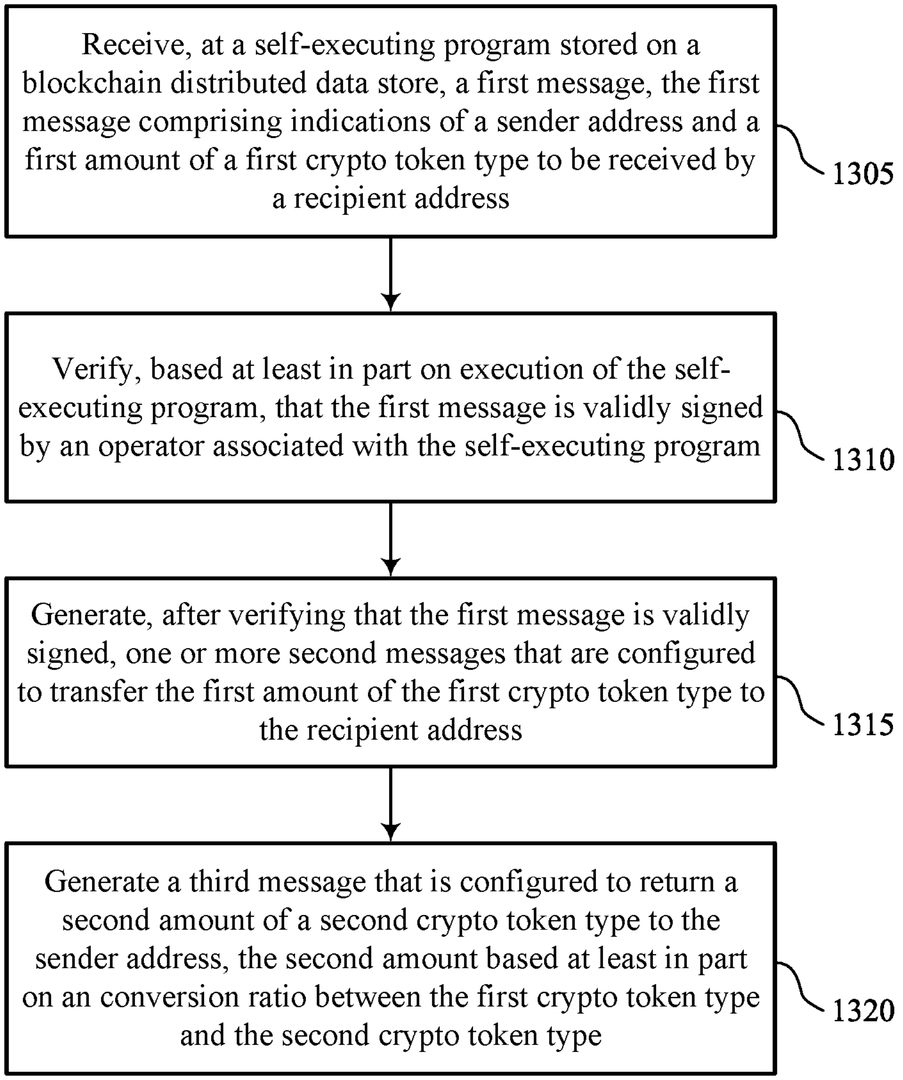

FIG. 13 illustrates a flowchart showing a method 1300 that supports a Web3 transfer protocol in accordance with aspects of the present disclosure. The operations of the method 1300 may be implemented by a custodial token platform or its components as described herein. For example, the operations of the method 1300 may be performed by a custodial token platform as described with reference to FIGS. 1 through 7. In some examples, a custodial token platform may execute a set of instructions to control the functional elements of the custodial token platform to perform the described functions. Additionally, or alternatively, the custodial token platform may perform aspects of the described functions using special-purpose hardware.

At 1305, the method may include receiving, at a self-executing program stored on a blockchain distributed data store, a first message, the first message comprising indications of a sender address and a first amount of a first crypto token type to be received by a recipient address. The operations of 1305 may be performed in accordance with examples as disclosed herein. In some examples, aspects of the operations of 1305 may be performed by a transfer intent interface 625 as described with reference to FIG. 6.

At 1310, the method may include verifying, based at least in part on execution of the self-executing program, that the first message is validly signed by an operator associated with the self-executing program. The operations of 1310 may be performed in accordance with examples as disclosed herein. In some examples, aspects of the operations of 1310 may be performed by a signature verification component 630 as described with reference to FIG. 6.

At 1315, the method may include generating, after verifying that the first message is validly signed, one or more second messages that are configured to transfer the first amount of the first crypto token type to the recipient address. The operations of 1315 may be performed in accordance with examples as disclosed herein. In some examples, aspects of the operations of 1315 may be performed by a transfer message component 635 as described with reference to FIG. 6.

At 1320, the method may include generating a third message that is configured to return a second amount of a second crypto token type to the sender address, the second amount based at least in part on a conversion ratio between the first crypto token type and the second crypto token type. The operations of 1320 may be performed in accordance with examples as disclosed herein. In some examples, aspects of the operations of 1320 may be performed by a return component 650 as described with reference to FIG. 6.

Figure 14:
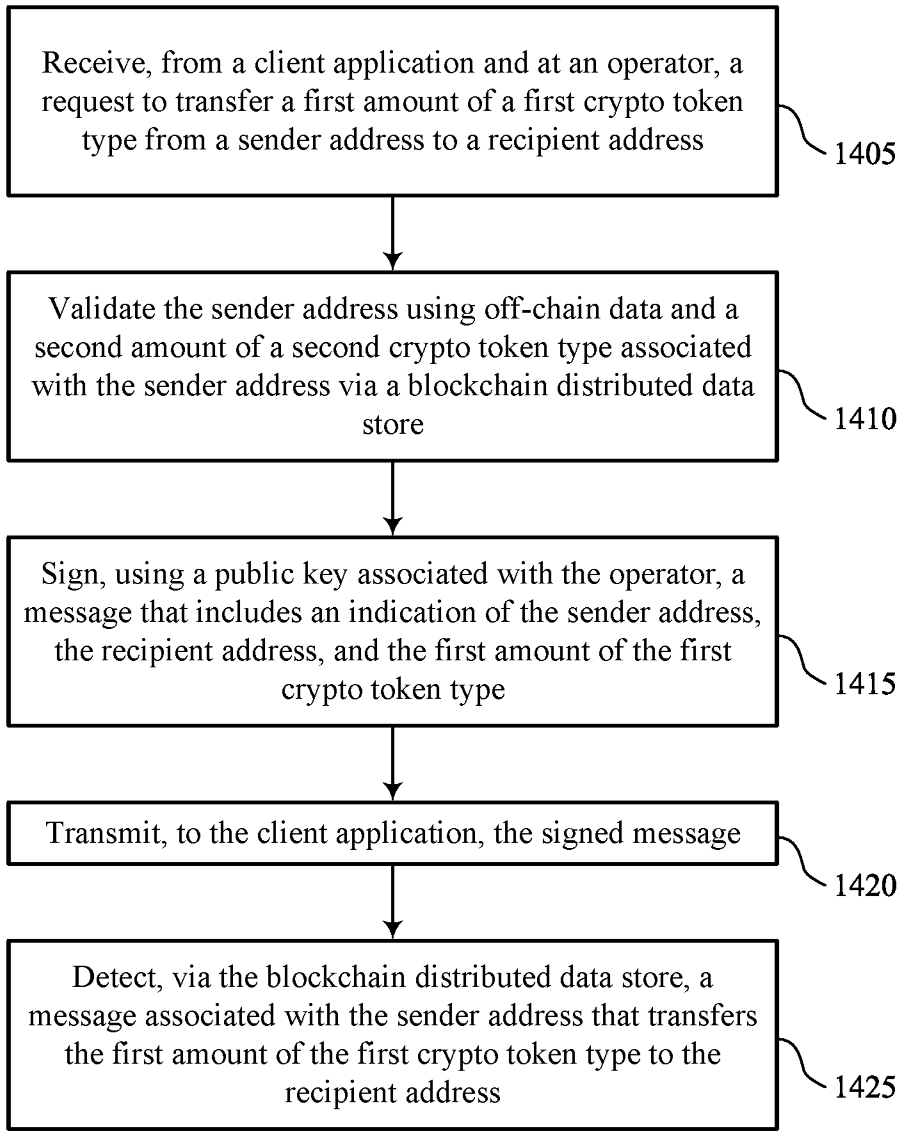

FIG. 14 illustrates a flowchart showing a method 1400 that supports a Web3 transfer protocol in accordance with aspects of the present disclosure. The operations of the method 1400 may be implemented by a server or its components as described herein. For example, the operations of the method 1400 may be performed by a server as described with reference to FIGS. 1 through 4 and 8 through 10. In some examples, a server may execute a set of instructions to control the functional elements of the server to perform the described functions. Additionally, or alternatively, the server may perform aspects of the described functions using special-purpose hardware.

At 1405, the method may include receiving, from a client application and at an operator, a request to transfer a first amount of a first crypto token type from a sender address to a recipient address. The operations of 1405 may be performed in accordance with examples as disclosed herein. In some examples, aspects of the operations of 1405 may be performed by a transfer intent request interface 925 as described with reference to FIG. 9.

At 1410, the method may include validating the sender address using off-chain data and a second amount of a second crypto token type associated with the sender address via a blockchain distributed data store. The operations of 1410 may be performed in accordance with examples as disclosed herein. In some examples, aspects of the operations of 1410 may be performed by a sender validation component 930 as described with reference to FIG. 9.

At 1415, the method may include signing, using a public key associated with the operator, a message that includes an indication of the sender address, the recipient address, and the first amount of the first crypto token type. The operations of 1415 may be performed in accordance with examples as disclosed herein. In some examples, aspects of the operations of 1415 may be performed by a message signing component 935 as described with reference to FIG. 9.

At 1420, the method may include transmitting, to the client application, the signed message. The operations of 1420 may be performed in accordance with examples as disclosed herein. In some examples, aspects of the operations of 1420 may be performed by a message interface 940 as described with reference to FIG. 9.

At 1425, the method may include detecting, via the blockchain distributed data store, a message associated with the sender address that transfers the first amount of the first crypto token type to the recipient address. The operations of 1425 may be performed in accordance with examples as disclosed herein. In some examples, aspects of the operations of 1425 may be performed by a transfer validation component 945 as described with reference to FIG. 9.

Figure 15:
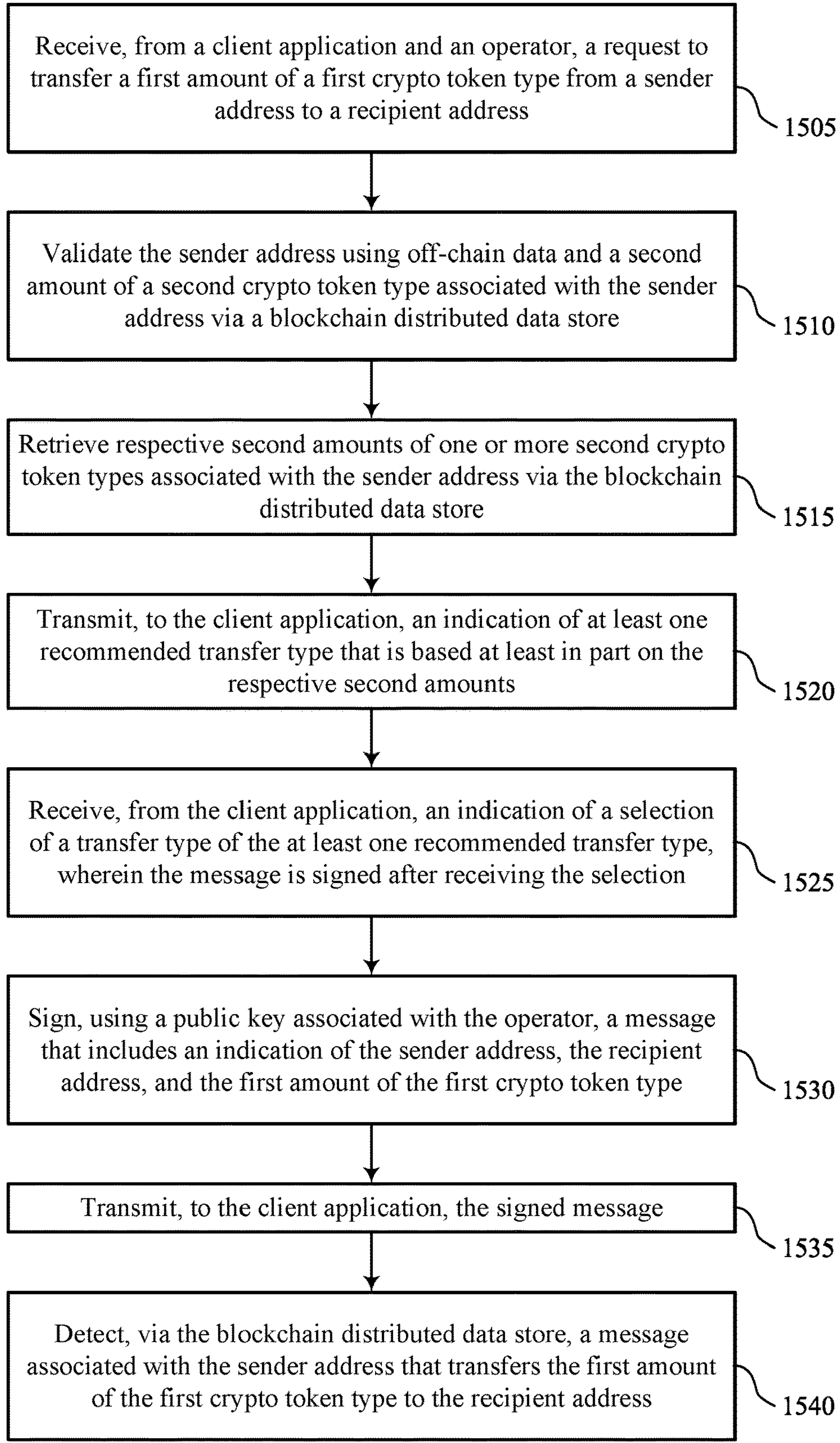

FIG. 15 illustrates a flowchart showing a method 1500 that supports a Web3 transfer protocol in accordance with aspects of the present disclosure. The operations of the method 1500 may be implemented by a server or its components as described herein. For example, the operations of the method 1500 may be performed by a server as described with reference to FIGS. 1 through 4 and 8 through 10. In some examples, a server may execute a set of instructions to control the functional elements of the server to perform the described functions. Additionally, or alternatively, the server may perform aspects of the described functions using special-purpose hardware.

At 1505, the method may include receiving, from a client application and at an operator, a request to transfer a first amount of a first crypto token type from a sender address to a recipient address. The operations of 1505 may be performed in accordance with examples as disclosed herein. In some examples, aspects of the operations of 1505 may be performed by a transfer intent request interface 925 as described with reference to FIG. 9.

At 1510, the method may include validating the sender address using off-chain data and a second amount of a second crypto token type associated with the sender address via a blockchain distributed data store. The operations of 1510 may be performed in accordance with examples as disclosed herein. In some examples, aspects of the operations of 1510 may be performed by a sender validation component 930 as described with reference to FIG. 9.

At 1515, the method may include retrieving respective second amounts of one or more second crypto token types associated with the sender address via the blockchain distributed data store. The operations of 1515 may be performed in accordance with examples as disclosed herein. In some examples, aspects of the operations of 1515 may be performed by an amount identification component 950 as described with reference to FIG. 9.

At 1520, the method may include transmitting, to the client application, an indication of at least one recommended transfer type that is based at least in part on the respective second amounts. The operations of 1520 may be performed in accordance with examples as disclosed herein. In some examples, aspects of the operations of 1520 may be performed by a transfer recommendation component 955 as described with reference to FIG. 9.

At 1525, the method may include receiving, from the client application, an indication of a selection of a transfer type of the at least one recommended transfer type, wherein the message is signed after receiving the selection. The operations of 1525 may be performed in accordance with examples as disclosed herein. In some examples, aspects of the operations of 1525 may be performed by a transfer recommendation component 955 as described with reference to FIG. 9.

At 1530, the method may include signing, using a public key associated with the operator, a message that includes an indication of the sender address, the recipient address, and the first amount of the first crypto token type. The operations of 1530 may be performed in accordance with examples as disclosed herein. In some examples, aspects of the operations of 1530 may be performed by a message signing component 935 as described with reference to FIG. 9.

At 1535, the method may include transmitting, to the client application, the signed message. The operations of 1535 may be performed in accordance with examples as disclosed herein. In some examples, aspects of the operations of 1535 may be performed by a message interface 940 as described with reference to FIG. 9.

At 1540, the method may include detecting, via the blockchain distributed data store, a message associated with the sender address that transfers the first amount of the first crypto token type to the recipient address. The operations of 1540 may be performed in accordance with examples as disclosed herein. In some examples, aspects of the operations of 1540 may be performed by a transfer validation component 945 as described with reference to FIG. 9.

Figure 16:
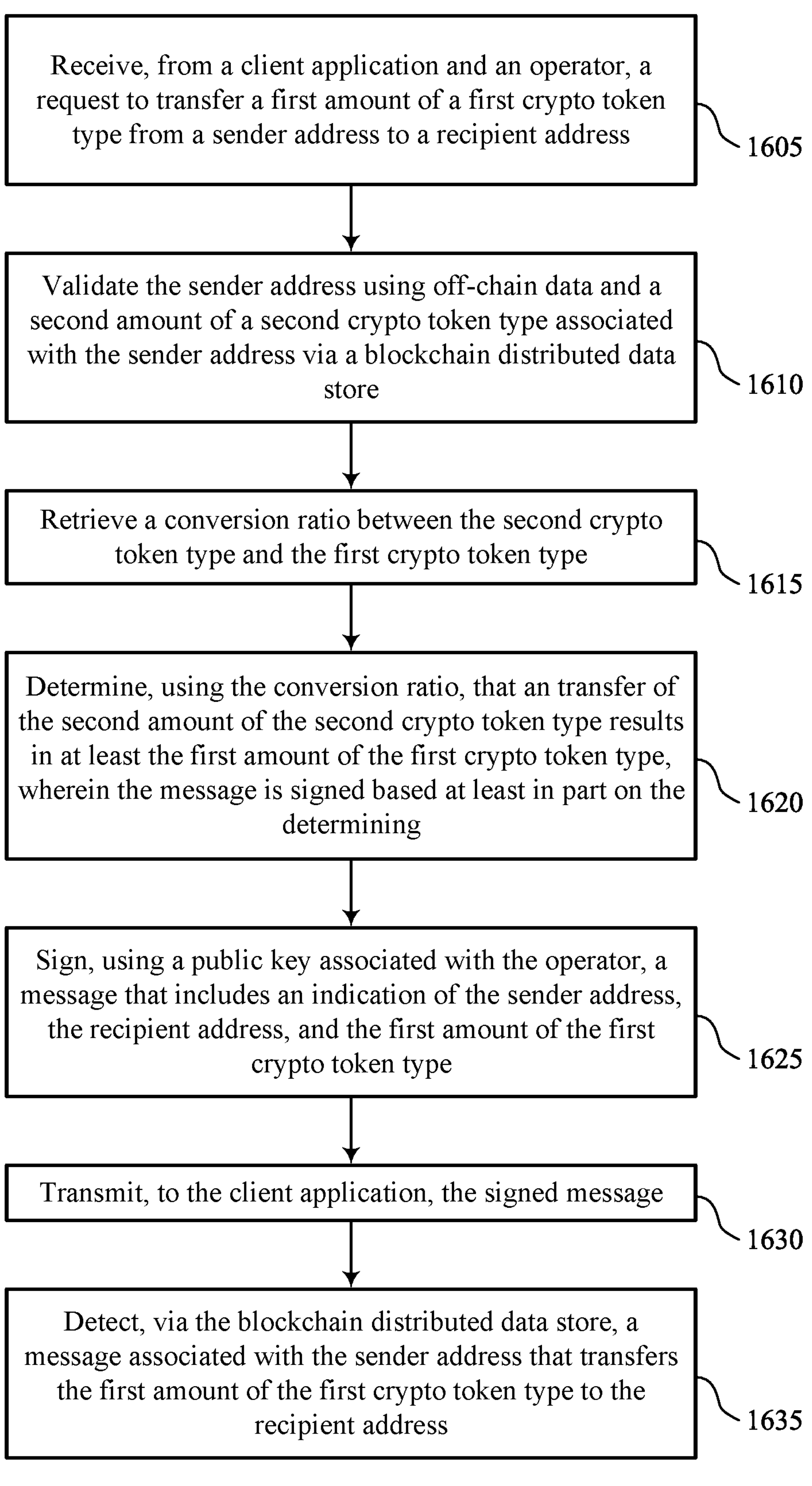

FIG. 16 illustrates a flowchart showing a method 1600 that supports a Web3 transfer protocol in accordance with aspects of the present disclosure. The operations of the method 1600 may be implemented by a server or its components as described herein. For example, the operations of the method 1600 may be performed by a server as described with reference to FIGS. 1 through 4 and 8 through 10. In some examples, a server may execute a set of instructions to control the functional elements of the server to perform the described functions. Additionally, or alternatively, the server may perform aspects of the described functions using special-purpose hardware.

At 1605, the method may include receiving, from a client application and at an operator, a request to transfer a first amount of a first crypto token type from a sender address to a recipient address. The operations of 1605 may be performed in accordance with examples as disclosed herein. In some examples, aspects of the operations of 1605 may be performed by a transfer intent request interface 925 as described with reference to FIG. 9.

At 1610, the method may include validating the sender address using off-chain data and a second amount of a second crypto token type associated with the sender address via a blockchain distributed data store. The operations of 1610 may be performed in accordance with examples as disclosed herein. In some examples, aspects of the operations of 1610 may be performed by a sender validation component 930 as described with reference to FIG. 9.

At 1615, the method may include retrieving a conversion ratio between the second crypto token type and the first crypto token type. The operations of 1615 may be performed in accordance with examples as disclosed herein. In some examples, aspects of the operations of 1615 may be performed by a conversion ratio component 960 as described with reference to FIG. 9.

At 1620, the method may include determining, using the conversion ratio, that a transfer of the second amount of the second crypto token type results in at least the first amount of the first crypto token type, wherein the message is signed based at least in part on the determining. The operations of 1620 may be performed in accordance with examples as disclosed herein. In some examples, aspects of the operations of 1620 may be performed by a sender validation component 930 as described with reference to FIG. 9.

At 1625, the method may include signing, using a public key associated with the operator, a message that includes an indication of the sender address, the recipient address, and the first amount of the first crypto token type. The operations of 1625 may be performed in accordance with examples as disclosed herein. In some examples, aspects of the operations of 1625 may be performed by a message signing component 935 as described with reference to FIG. 9.

At 1630, the method may include transmitting, to the client application, the signed message. The operations of 1630 may be performed in accordance with examples as disclosed herein. In some examples, aspects of the operations of 1630 may be performed by a message interface 940 as described with reference to FIG. 9.

At 1635, the method may include detecting, via the blockchain distributed data store, a message associated with the sender address that transfers the first amount of the first crypto token type to the recipient address. The operations of 1635 may be performed in accordance with examples as disclosed herein. In some examples, aspects of the operations of 1635 may be performed by a transfer validation component 945 as described with reference to FIG. 9.

A method for data processing is described. The method may include receiving, at a self-executing program stored on a blockchain distributed data store, a first message, the first message comprising indications of a sender address and a first amount of a first crypto token type to be received by a recipient address, verifying, based at least in part on execution of the self-executing program, that the first message is validly signed by an operator associated with the self-executing program, and generating, after verifying that the first message is validly signed, one or more second messages that are configured to transfer the first amount of the first crypto token type to the recipient address.

An apparatus for data processing is described. The apparatus may include a processor, memory coupled with the processor, and instructions stored in the memory. The instructions may be executable by the processor to cause the apparatus to receive, at a self-executing program stored on a blockchain distributed data store, a first message, the first message comprising indications of a sender address and a first amount of a first crypto token type to be received by a recipient address, verifying, based at least in part on execution of the self-executing program, that the first message is validly signed by an operator associated with the self-executing program, and generating, after verifying that the first message is validly signed, one or more second messages that are configured to transfer the first amount of the first crypto token type to the recipient address.

Another apparatus for data processing is described. The apparatus may include means for receiving, at a self-executing program stored on a blockchain distributed data store, a first message, the first message comprising indications of a sender address and a first amount of a first crypto token type to be received by a recipient address, means for verifying, based at least in part on execution of the self-executing program, that the first message is validly signed by an operator associated with the self-executing program, and means for generating, after verifying that the first message is validly signed, one or more second messages that are configured to transfer the first amount of the first crypto token type to the recipient address.

A non-transitory computer-readable medium storing code for data processing is described. The code may include instructions executable by a processor to receive, at a self-executing program stored on a blockchain distributed data store, a first message, the first message comprising indications of a sender address and a first amount of a first crypto token type to be received by a recipient address, verifying, based at least in part on execution of the self-executing program, that the first message is validly signed by an operator associated with the self-executing program, and generating, after verifying that the first message is validly signed, one or more second messages that are configured to transfer the first amount of the first crypto token type to the recipient address.

In some examples of the method, apparatuses, and non-transitory computer-readable medium described herein, generating the one or more second messages may include operations, features, means, or instructions for generating a swap message that may be configured to swap a second amount of a second crypto token type that may be attributed to the sender address in the blockchain distributed data store for the first amount of the first crypto token type and generating a transfer message that may be configured to transfer the first amount of the first crypto token type to the recipient address.

In some examples of the method, apparatuses, and non-transitory computer-readable medium described herein, generating the swap message may include operations, features, means, or instructions for generating the swap message that may be configured to call a second self-executing program associated with a decentralized exchange protocol, wherein the second self-executing program swaps the second amount of the second crypto token type for the first amount of the first crypto token type, and returns the first amount of the first crypto token type to an address associated with the self-executing program.

In some examples of the method, apparatuses, and non-transitory computer-readable medium described herein, generating the swap message may include operations, features, means, or instructions for generating the swap message that includes an indication of the first amount of the first crypto token type.

In some examples of the method, apparatuses, and non-transitory computer-readable medium described herein, generating the one or more second messages may include operations, features, means, or instructions for generating a wrap message that may be configured to wrap or unwrap a second amount of a second crypto token type resulting in the first amount of the first crypto token type and generating a transfer message that may be configured to transfer the first amount of the first crypto token type to the recipient address.

Some examples of the method, apparatuses, and non-transitory computer-readable medium described herein may further include operations, features, means, or instructions for generating a third message that may be configured to return a second amount of a second crypto token type to the sender address, the second amount based at least in part on a conversion ratio between the first crypto token type and the second crypto token type.

In some examples of the method, apparatuses, and non-transitory computer-readable medium described herein, the first message and the one or more second messages further comprise metadata that references an off-chain charge associated with the sender address and the recipient address.

In some examples of the method, apparatuses, and non-transitory computer-readable medium described herein, the first message includes a time value that indicates a time by which a message indicating the transfer of the first amount to the recipient address is to be included in a block on the blockchain distributed data store and the self-executing program may be configured to verify the time value before generating the one or more second messages.

In some examples of the method, apparatuses, and non-transitory computer-readable medium described herein, the first message includes a fee amount that is to be transmitted to the operator.

In some examples of the method, apparatuses, and non-transitory computer-readable medium described herein, the first message includes a second amount of a second crypto token type to be transmitted by a transmitter address that transmits the first message.

A method for data processing is described. The method may include receiving, from a client application and at an operator, a request to transfer a first amount of a first crypto token type from a sender address to a recipient address, validating the sender address using off-chain data and a second amount of a second crypto token type associated with the sender address via a blockchain distributed data store, signing, using a public key associated with the operator, a message that includes an indication of the sender address, the recipient address, and the first amount of the first crypto token type, transmitting, to the client application, the signed message, and detecting, via the blockchain distributed data store, a message associated with the sender address that transfers the first amount of the first crypto token type to the recipient address.

An apparatus for data processing is described. The apparatus may include a processor, memory coupled with the processor, and instructions stored in the memory. The instructions may be executable by the processor to cause the apparatus to receive, from a client application and at an operator, a request to transfer a first amount of a first crypto token type from a sender address to a recipient address, validate the sender address using off-chain data and a second amount of a second crypto token type associated with the sender address via a blockchain distributed data store, signing, using a public key associated with the operator, a message that includes an indication of the sender address, the recipient address, and the first amount of the first crypto token type, transmit, to the client application, the signed message, and detect, via the blockchain distributed data store, a message associated with the sender address that transfers the first amount of the first crypto token type to the recipient address.

Another apparatus for data processing is described. The apparatus may include means for receiving, from a client application and at an operator, a request to transfer a first amount of a first crypto token type from a sender address to a recipient address, means for validating the sender address using off-chain data and a second amount of a second crypto token type associated with the sender address via a blockchain distributed data store, means for signing, using a public key associated with the operator, a message that includes an indication of the sender address, the recipient address, and the first amount of the first crypto token type, means for transmitting, to the client application, the signed message, and means for detecting, via the blockchain distributed data store, a message associated with the sender address that transfers the first amount of the first crypto token type to the recipient address.

A non-transitory computer-readable medium storing code for data processing is described. The code may include instructions executable by a processor to receive, from a client application and at an operator, a request to transfer a first amount of a first crypto token type from a sender address to a recipient address, validate the sender address using off-chain data and a second amount of a second crypto token type associated with the sender address via a blockchain distributed data store, signing, using a public key associated with the operator, a message that includes an indication of the sender address, the recipient address, and the first amount of the first crypto token type, transmit, to the client application, the signed message, and detect, via the blockchain distributed data store, a message associated with the sender address that transfers the first amount of the first crypto token type to the recipient address.

Some examples of the method, apparatuses, and non-transitory computer-readable medium described herein may further include operations, features, means, or instructions for retrieving respective second amounts of one or more second crypto token types associated with the sender address via the blockchain distributed data store, transmitting, to the client application, an indication of at least one recommended transfer type that may be based at least in part on the respective second amounts, and receiving, from the client application, an indication of a selection of a transfer type of the at least one recommended transfer type, wherein the message may be signed after receiving the selection.

In some examples of the method, apparatuses, and non-transitory computer-readable medium described herein, validating the second amount of the second crypto token type may include operations, features, means, or instructions for retrieving a conversion ratio between the second crypto token type and the first crypto token type and determining, using the conversion ratio, that a transfer of the second amount of the second crypto token type results in at least the first amount of the first crypto token type, wherein the message may be signed based at least in part on the determining.

In some examples of the method, apparatuses, and non-transitory computer-readable medium described herein, the request includes an indication of a return address and the signed message includes an indication of the return address.

In some examples of the method, apparatuses, and non-transitory computer-readable medium described herein, signing the message may include operations, features, means, or instructions for signing the message that includes a time value that indicates a time by which a message indicating a transfer of the first amount to the recipient address is to be included in a block on the blockchain distributed data store.

In some examples of the method, apparatuses, and non-transitory computer-readable medium described herein, signing the message may include operations, features, means, or instructions for signing the message that includes metadata that references an off-chain charge associated with the sender address and the recipient address.

Some examples of the method, apparatuses, and non-transitory computer-readable medium described herein may further include operations, features, means, or instructions for receiving a second request to transfer a second amount of a second crypto token type from a second sender address to a second recipient address and rejecting the second request based at least in part on the second recipient address or on a third crypto token type attributed to the second sender address via the blockchain distributed data store.

In some examples of the method, apparatuses, and non-transitory computer-readable medium described herein, rejecting the second request may include operations, features, means, or instructions for transmitting, to the client application, an indication that the request may be rejected, refraining from signing a second message, or both.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for data processing, comprising:

receiving, from a client application and at an operator, a request to transfer a first amount of a first crypto token type from a sender address to a recipient address;

validating the sender address using off-chain data and a second amount of a second crypto token type associated with the sender address via a blockchain distributed data store;

signing, using a private key associated with the operator and based at least in part on validating the sender address, a message that includes an indication of the sender address, the recipient address, the first amount of the first crypto token type, and metadata that references an off-chain charge associated with the sender address and the recipient address;

transmitting, to the client application, the signed message;

monitoring the blockchain distributed data store for blockchain transactions associated with the metadata;

detecting, via the blockchain distributed data store using the metadata, a message associated with the sender address that transfers the first amount of the first crypto token type to the recipient address, wherein the message includes the metadata; and verifying, based at least in part on detecting the message, that the transfer of the first amount of the first crypto token type to the recipient address has occurred.

2. The method of claim 1, further comprising:

retrieving respective second amounts of one or more second crypto token types associated with the sender address via the blockchain distributed data store;

transmitting, to the client application, an indication of at least one recommended transfer type that is based at least in part on the respective second amounts; and receiving, from the client application, an indication of a selection of a transfer type of the at least one recommended transfer type, wherein the message is signed after receiving the selection.

3. The method of claim 1, wherein the request includes an indication of a return address and the signed message includes an indication of the return address.

4. The method of claim 1, wherein signing the message comprises:

signing the message that includes a time value that indicates a time by which a blockchain transaction indicating the transfer of the first amount to the recipient address is to be included in a block on the blockchain distributed data store.

5. The method of claim 1, further comprising:

receiving a second request to transfer a third amount of a third crypto token type from a second sender address to a second recipient address; and rejecting the second request based at least in part on the second recipient address or on a fourth crypto token type attributed to the second sender address via the blockchain distributed data store.

6. The method of claim 5, wherein rejecting the second request comprises:

transmitting, to the client application, an indication that the second request is rejected, refraining from signing a second message, or both.

7. The method of claim 1, wherein the metadata comprises a unique identifier that references the off-chain charge that is an agreement between a first entity associated with the sender address and a second entity associated with the recipient address and the message is associated with a blockchain transaction and the unique identifier, the unique identifier being recorded on a blockchain ledger of the blockchain distributed data store.

8. An apparatus for data processing, comprising:

a processor;

memory coupled with the processor; and instructions stored in the memory and executable by the processor to cause the apparatus to:

receive, from a client application and at an operator, a request to transfer a first amount of a first crypto token type from a sender address to a recipient address;

validate the sender address using off-chain data and a second amount of a second crypto token type associated with the sender address via a blockchain distributed data store;

sign, using a private key associated with the operator and based at least in part on validating the sender address, a message that includes an indication of the sender address, the recipient address, the first amount of the first crypto token type, and metadata that references an off-chain charge associated with the sender address and the recipient address;

transmit, to the client application, the signed message;

monitor the blockchain distributed data store for blockchain transactions associated with the metadata;

detect, via the blockchain distributed data store using the metadata, a message associated with the sender address that transfers the first amount of the first crypto token type to the recipient address, wherein the message includes the metadata; and verify, based at least in part on detecting the message, that the transfer of the first amount of the first crypto token type to the recipient address has occurred.

9. The apparatus of claim 8, wherein the instructions are further executable by the processor to cause the apparatus to:

retrieve respective second amounts of one or more second crypto token types associated with the sender address via the blockchain distributed data store;

transmit, to the client application, an indication of at least one recommended transfer type that is based at least in part on the respective second amounts; and receive, from the client application, an indication of a selection of a transfer type of the at least one recommended transfer type, wherein the message is signed after receiving the selection.

10. The apparatus of claim 8, wherein the request includes an indication of a return address and the signed message includes an indication of the return address.

11. The apparatus of claim 8, wherein the instructions to sign the message are executable by the processor to cause the apparatus to:

sign the message that includes a time value that indicates a time by which a blockchain transaction indicating the transfer of the first amount to the recipient address is to be included in a block on the blockchain distributed data store.

12. The apparatus of claim 8, wherein the metadata comprises a unique identifier that references the off-chain charge that is an agreement between a first entity associated with the sender address and a second entity associated with the recipient address, and the message is associated with a blockchain transaction and the unique identifier, the unique identifier being recorded on a blockchain ledger of the blockchain distributed data store.

13. A non-transitory computer-readable medium storing code for data processing, the code comprising instructions executable by a processor to:

receive, from a client application and at an operator, a request to transfer a first amount of a first crypto token type from a sender address to a recipient address;

validate the sender address using off-chain data and a second amount of a second crypto token type associated with the sender address via a blockchain distributed data store;

sign, using a private key associated with the operator and based at least in part on validating the sender address, a message that includes an indication of the sender address, the recipient address, the first amount of the first crypto token type, and metadata that references an off-chain charge associated with the sender address and the recipient address;

transmit, to the client application, the signed message;

monitor the blockchain distributed data store for blockchain transactions associated with the metadata;

detect, via the blockchain distributed data store using the metadata, a message associated with the sender address that transfers the first amount of the first crypto token type to the recipient address, wherein the message includes the metadata; and verify, based at least in part on detecting the message, that the transfer of the first amount of the first crypto token type to the recipient address has occurred.

14. The non-transitory computer-readable medium of claim 13, wherein the instructions are further executable by the processor to:

retrieve respective second amounts of one or more second crypto token types associated with the sender address via the blockchain distributed data store;

transmit, to the client application, an indication of at least one recommended transfer type that is based at least in part on the respective second amounts; and receive, from the client application, an indication of a selection of a transfer type of the at least one recommended transfer type, wherein the message is signed after receiving the selection.

15. The non-transitory computer-readable medium of claim 13, wherein the request includes an indication of a return address and the signed message includes an indication of the return address.

16. The non-transitory computer-readable medium of claim 13, wherein the instructions to sign the message are executable by the processor to:

sign the message that includes a time value that indicates a time by which a blockchain transaction indicating the transfer of the first amount to the recipient address is to be included in a block on the blockchain distributed data store.

17. The non-transitory computer-readable medium of claim 13, wherein the metadata comprises a unique identifier that references the off-chain charge that is an agreement between a first entity associated with the sender address and a second entity associated with the recipient address and the message is associated with a blockchain transaction and the unique identifier, the unique identifier being recorded on a blockchain ledger of the blockchain distributed data store.

* * * * *